United States Patent [19]
Torpie et al.
[11] 3,798,576
[45] Mar. 19, 1974

[54] AUTOMATIC EQUALIZATION METHOD AND APPARATUS

[75] Inventors: John D. Torpie, Penfield; Allan J. Bell, Fairport; Michael L. Gorham, Rochester; Walter G. Keating, Baldwinsville, all of N.Y.

[73] Assignee: Xerox Corporation, Stamford, Conn.

[22] Filed: Dec. 30, 1971

[21] Appl. No.: 214,146

[52] U.S. Cl. .................................... 333/18, 325/42
[51] Int. Cl. .................................... H04b 3/04
[58] Field of Search .................. 333/18; 325/42, 65; 235/152, 181

[56] References Cited

UNITED STATES PATENTS

| | | | |
|---|---|---|---|
| 3,665,171 | 5/1972 | Morrow | 235/152 |
| 3,670,269 | 6/1972 | Starr et al. | 333/18 |

*Primary Examiner*—Paul L. Gensler

[57] ABSTRACT

This invention relates to a method of and an apparatus for providing equalization to frequency dependent delay and amplitude distortions in a transmission line. The apparatus includes an adjustable equalizer having a plurality of delay networks, an amplifier, a peak-to-average difference detector, and a control logic for selectively switching the delay networks and amplifier into and out of the path for the incoming signal. Adjustment of the equalizer to a given transmission line is carried out under the control of the control logic and in response to peak-to-average difference signals supplied by the detector. To that end, a train of test pulses is transmitted to the equalizer via the transmission line, and the delay networks and amplifier are selectively switched into and out of the signal path in timed synchronism with successive ones of those pulses, thereby providing different combinations of phase and/or amplitude compensation for such pulses. The peak-to-average difference detector responds to the compensated pulses to identify the particular delay network or delay network/amplifier combination that best compensates for the distortion introduced by the transmission line, and the control logic locks that combination into the signal path. In the case where the equalizer is used in an FM transmission system, it is interposed between the transmission line and the FM demodulator so that the equalization takes place prior to the recovery of the demodulated baseband signal.

34 Claims, 21 Drawing Figures

PATENTED MAR 19 1974 3,798,576

SHEET 03 OF 17

PATENTED MAR 19 1974

3,798,576

SHEET 12 OF 17

BUFFER MEMORY

PRIORITY DECODER NETWORK

AUTOMATIC EQUALIZATION METHOD AND APPARATUS

BACKGROUND OF THE INVENTION

This invention relates, generally, to a method of and an apparatus for compensating for signal distortion and, more particularly, to an improved method of and apparatus for automatically introducing an amount of delay and attenuation to substantially compensate for the delay and amplitude distortion experienced by a signal passed through a bandwidth limited transmission line.

Most transmission media tend to cause a degree of signal distortion, normally in the form of frequency dependent phase delays and attenuation. As a general rule, such distortion is undesirable because it changes the amplitude and phase relationships of the spectral components of the signal thereby degrading, the quality or fidelity of the received signal.

Both fixed and variable equalizers have previously been used with some measure of success to compensate for such distortion. However, fixed equalizers, by their very nature, are not very satisfactory in providing the necessary equalization for a wide range of frequency dependent delay distortion. Prior art variable equalizers, on the other hand, have typically included rather complex and costly means for automatically varying the amount of equalization depending upon the level of delay distortion of a particular transmission line to which it is connected.

SUMMARY OF THE INVENTION

Accordingly, an object of the present invention resides in the provision of an improved method and apparatus to overcome the aforementioned shortcomings of the prior art in general.

Another object of the invention is in the provision of a more efficient method and less costly apparatus to equalize transmission line distortions.

A further object of the present invention resides in the provision of an improved method and apparatus for automatically selecting out of several different equalizers sections the one that most closely complements (i.e., inversely matches) the distortion characteristics of a given voice band transmission line.

Broadly stated, in accordance with the present invention, the foregoing and further objects are achieved as follows: The apparatus is provided with an adjustable equalization network having a plurality of delay networks and an amplifier, together with control means including distortion level measuring means and a logic control circuitry.

A train of test pulses is transmitted to the equalizer via the transmission line of interest, and the delay networks and the amplifier are selectively switched into and out of the equalizer in timed synchronism with those pulses, thereby permitting the compensating effects of the several delay networks, taken independently and in combination with the amplifier stage, to be compared. The distortion measuring means identifies the delay network or delay network/amplifier combination which most closely complements the distortion characteristic of the transmission line, and the control logic then locks that network or combination into the signal path. At that point, the equalizer is adjusted to have an amplitude and/or phase shaping characteristic substantially complementing that of the transmission line.

Another feature of the present invention resides in the provison of peak-to-average difference detection means for providing distortion level indicating signals.

A further feature of the present invention resides in the provision of an equalizer which provides the equalization prior to the demodulation and utilization of an incoming signal.

A further feature of this invention is the provision of an automatically adjustable equalizer which is compatible with other fixed or adjustable equalizers and which is capable of providing several different time delay versus frequency characteristics for phase compensation, together with or independently of a predetermined amplitude versus frequency characteristic for amplitude compensation.

Yet another feature of the instant invention is the provision of alternative techniques for adjusting the equalizer in response to either one of two sets of test pulses.

The foregoing and other objects and features of the present invention will be more clearly understood when the following detailed description is read in conjunction with the accompanying drawings, in which.

Figure 1:
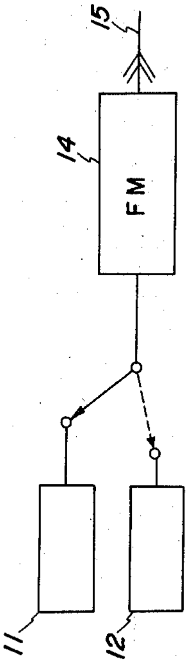
FIG. 1 is a simplified block diagram of a facsimile transceiver.
Figure 2:
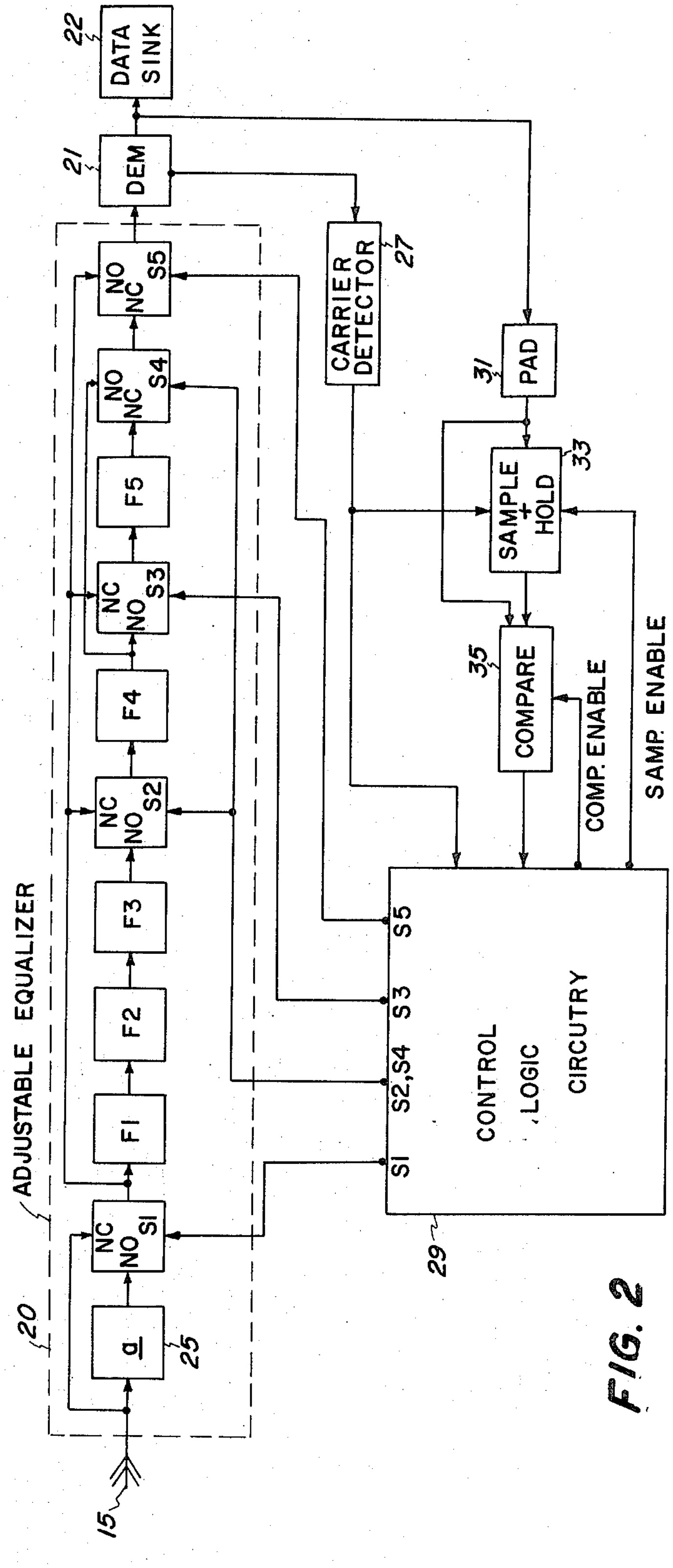
FIG. 2 is a block diagram of an equalizer constructed in accordance with the present invention and suitable for use with the transceiver shown in FIG. 1.
Figure 16:
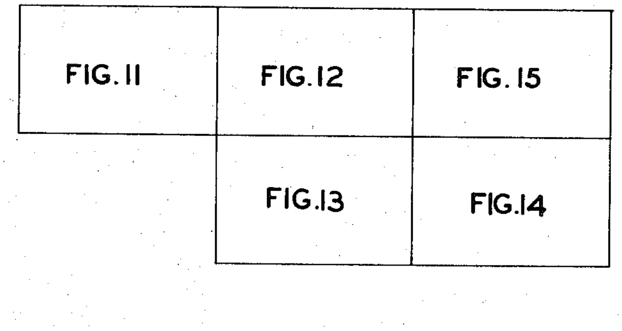
Figure 18:
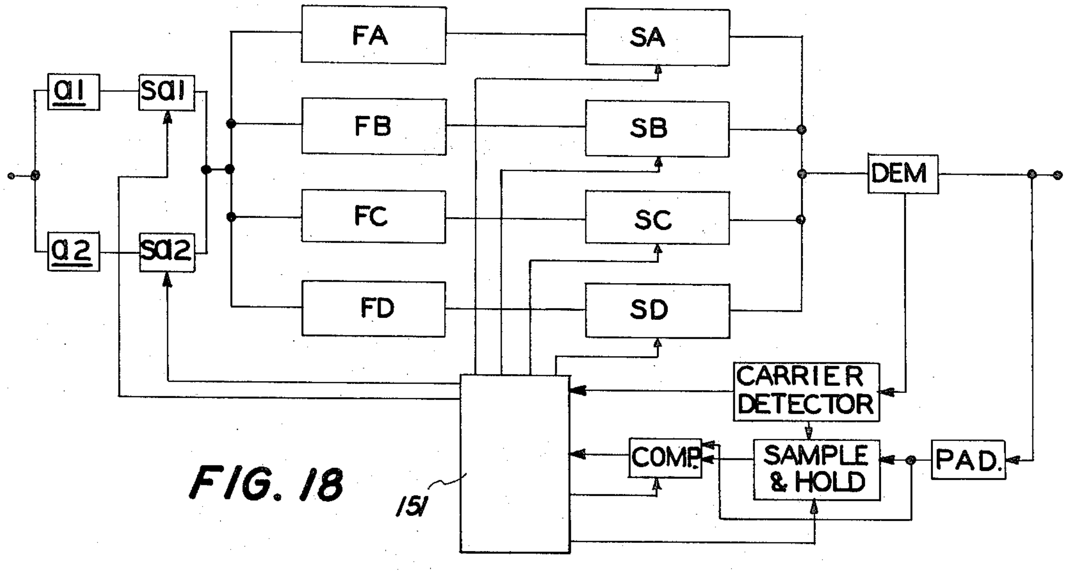
Figure 17A:
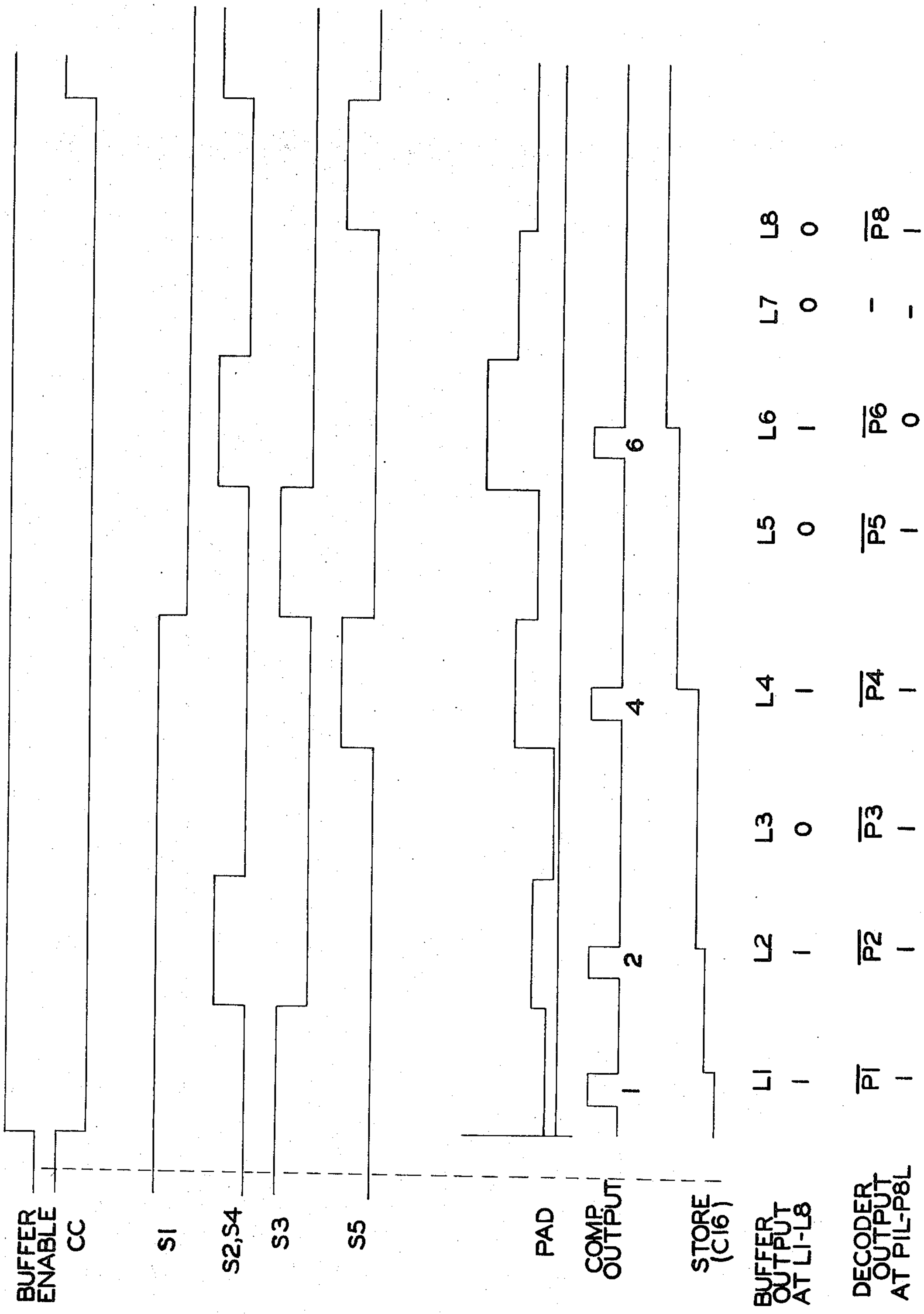
Figure 17B:
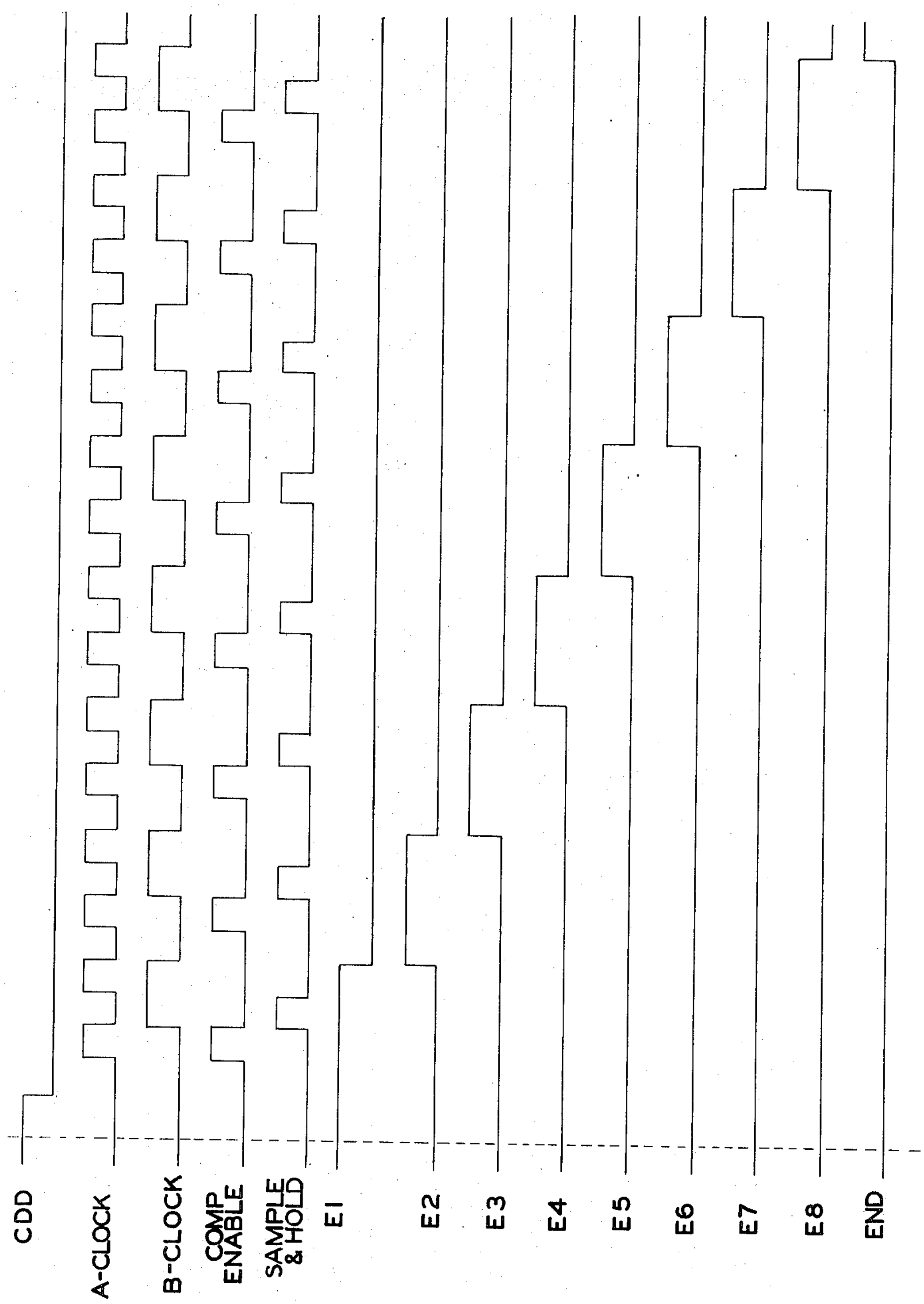

FIGS. 11 – 15 combine to illustrate an alternative control logic suitable for use in the equalizer shown in FIG. 2;

FIG. 16 shows the manner in which the detailed circuits shown in FIGS. 11 through 15 are combined to form the alternative control logic circuitry;

FIGS. 17A and 17B show the waveforms at various points in the logic circuitry shown in FIGS. 11 through 15; and FIG. 18 shows an alternative embodiment of the equalizer in which the amplitude shaping and the phase delay networks are connected in parallel.

DETAILED DESCRIPTION OF THE PREFERRED EMBODIMENT

Referring to FIGS. 1 through 4, in general the equalization apparatus of the present invention is contemplated for use in a transmission system in which a train comprising a predetermined number of discrete test pulses is transmitted either from a separate pulse source 11, or from a data source 12 prior to the transmission of any data. The series train of pulses may be modulated by an FM modulator 14 and transmitted over a channel 15 having a limited bandwidth capability, such as an ordinary telephone line. The transmission channel introduces frequency dependent phase delay and amplitude attenuation to the test pulses before they are received by the receiver.

At the receiver, the incoming pulses are transmitted through an adjustable equalization network 20, demodulated to baseband by a suitable demodulator 21 and then applied to a data utilization means or data sink 22. The adjustable equalization network comprises an amplifier 25, all-pass delay networks F1–F5 and switches S1–S5 connected in series cascade as shown. The apparatus also includes a carrier detector 27 for detecting the modulated carrier signal. The detected carrier signal is used to actuate a control logic circuitry 29. The apparatus also includes a peak-to-average difference (PAD) detector 31 for deriving signals representative of the phase and amplitude distortion suffered by the test pulses. The PAD detector 31 is coupled to the output of the demodulator 21 so that the combined effects of the transmission line 15 and the adjustable equalization network are taken into consideration. A sample and hold circuit 33 and a compare network 35 are interposed in the manner shown between the PAD detector circuitry 31 and the control logic circuitry 29 for deriving a distortion signal which identifies the particular equalization network, which in combination with the transmission line 15, results in the least amount of distortion.

Figure 3:
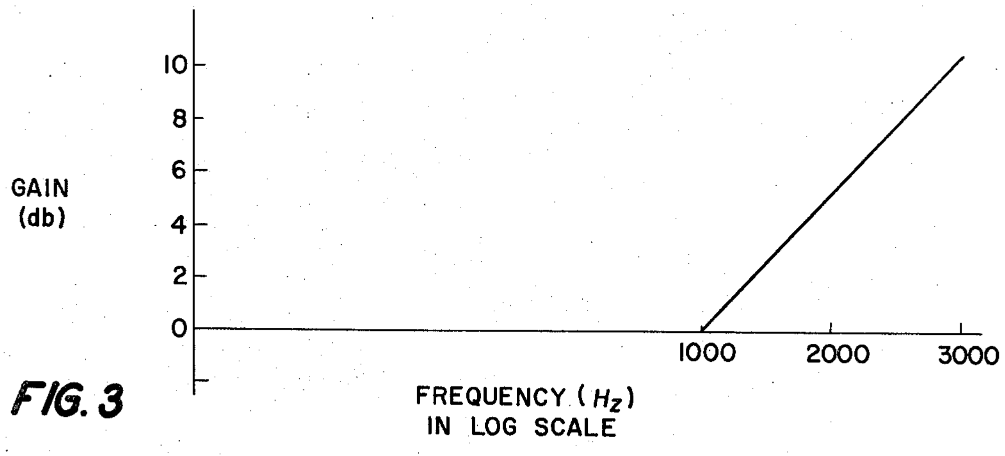
FIG. 3 shows a typical amplitude versus frequency characteristic for the amplifier included in the equalizer in shown FIG. 2.

As will be seen, the carrier detector 27 supplies a triggering signal for the control logic 29 when carrier energy is first received. That initiates a carrier adjust cycle during which the switches S1–S5 are operated in a predetermined order in response to control signals supplied by the logic 29 so that the amplifier 25 and the delay networks F1–F5 are selectively inserted into and removed from the series signal path between the transmission line 15 and the demodulator 21. Several different equalizers are, therefore, presented in the ordinary course of a carrier adjust cycle, thereby enabling the one that most closely complements the particular characteristics of the transmission line 15 to be identified and selected, as more fully described herein below. Referring to FIG. 3, the gain versus frequency characteristic for the amplifier 25 is suitably selected to complement a typical attenuation characteristics of the transmission line. For example, for facsimile systems that rely on the public switched telephone network, the amplifier 25 suitably has designed to have a fairly flat gain up to 1000 Hz and a logarithmetically increasing gain characteristic for higher frequencies. The delay networks F1–F5 are tuned filter circuits having different delay versus frequency response characteristics as shown by the wave forms F1–F5 so that the overall delay characteristics of the equalizer 20 may be adjusted to more or less complement the phase distortion caused by any one of several different transmission lines.

For adjusting the equalizer 20 to the particular characteristics of the transmission line 15, test pulses are transmitted during the equalizer adjust cycle. The amplifier 25 and the delay networks F1–F5 are selectively switched into and out of the equalizer 20 in timed synchronism with successive ones of the test pulses, thereby providing different combinations of phase and phase/amplitude delay for the signals received in response to those pulses. A peak-to-average difference signal is derived by the PAD circuit 31 from each of the compensated signals, and the largest of the peak-to-average difference signals is stored by the sample and hold circuit 33. In the embodiment shown in FIG. 2, the process is then repeated with a second set of test pulses, but this time the peak-to-average difference signals are routed to the comparator 35 rather than to the sample and hold circuit 33. The comparator 35 then compares each of the peak-to-average difference signals applied thereto against the one previously stored by the sample and hold circuit 33 until a peak-to-average difference signal which equals or exceeds the stored signal is received. When that occurs, the comparator 35 supplies a control signal for the control logic 29 which, in turn, terminates the equalizer adjust cycle so that the delay network or delay network/amplifier combination then in the equalizer 20 is retained. If the comparator 35 fails for one reason or the other to receive a peak-to-average difference signal at least equal to the one stored by the sample and hold circuit 33, the control logic automatically inserts a preselected delay network or delay network/amplifier combination into the equalizer 20 to provide a predetermined equalization characteristic.

The adjustable equalizer of the present invention is shown in combination with an FM transmission system. However, its application is not so limited in that it is applicable to other forms of transmission systems such as AM and PAM transmission systems.

DETAILED DESCRIPTION OF THE EQUALIZER SHOWN IN FIGS. 5, 6 AND 7

Figure 5:
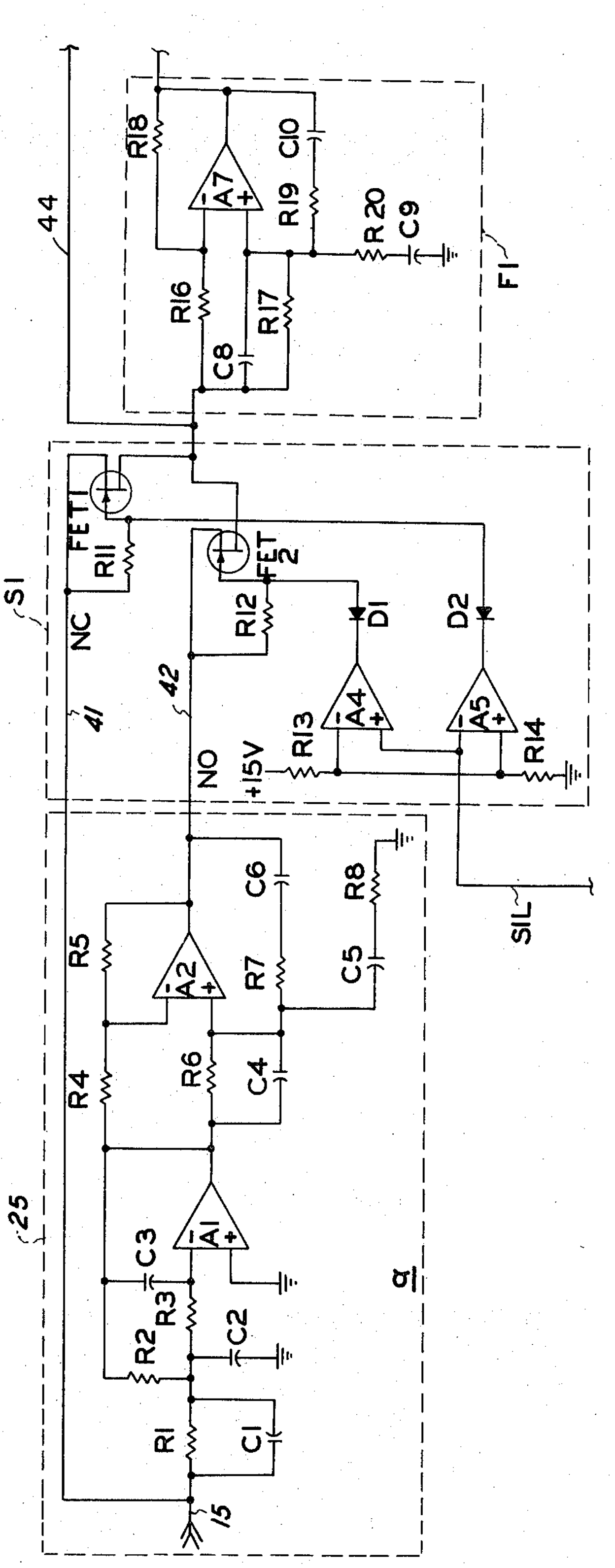
FIGS. 5, 6 and 7 show in detail an illustrative embodiment of the equalizer of the present invention.
Figure 6:
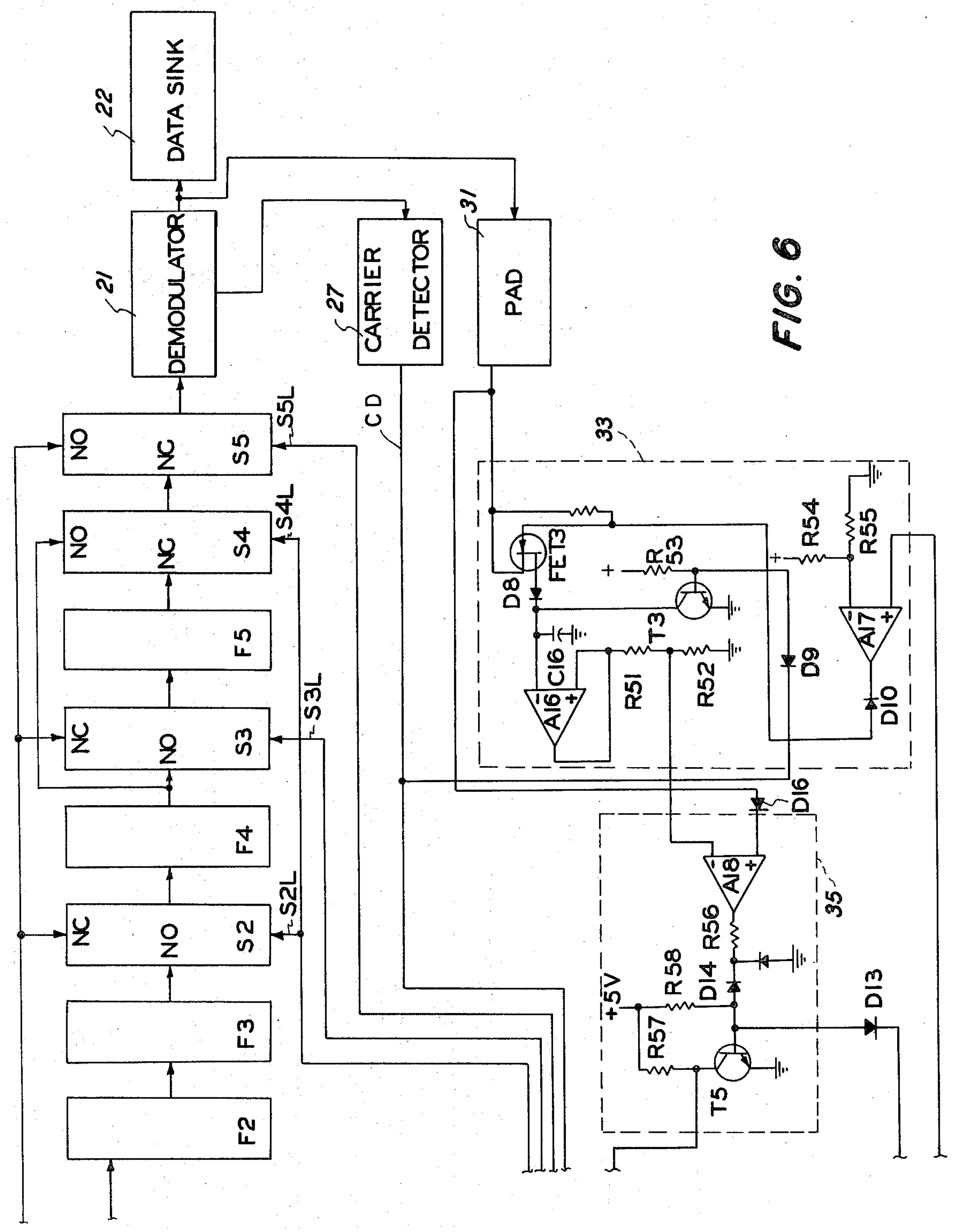
Figure 7:
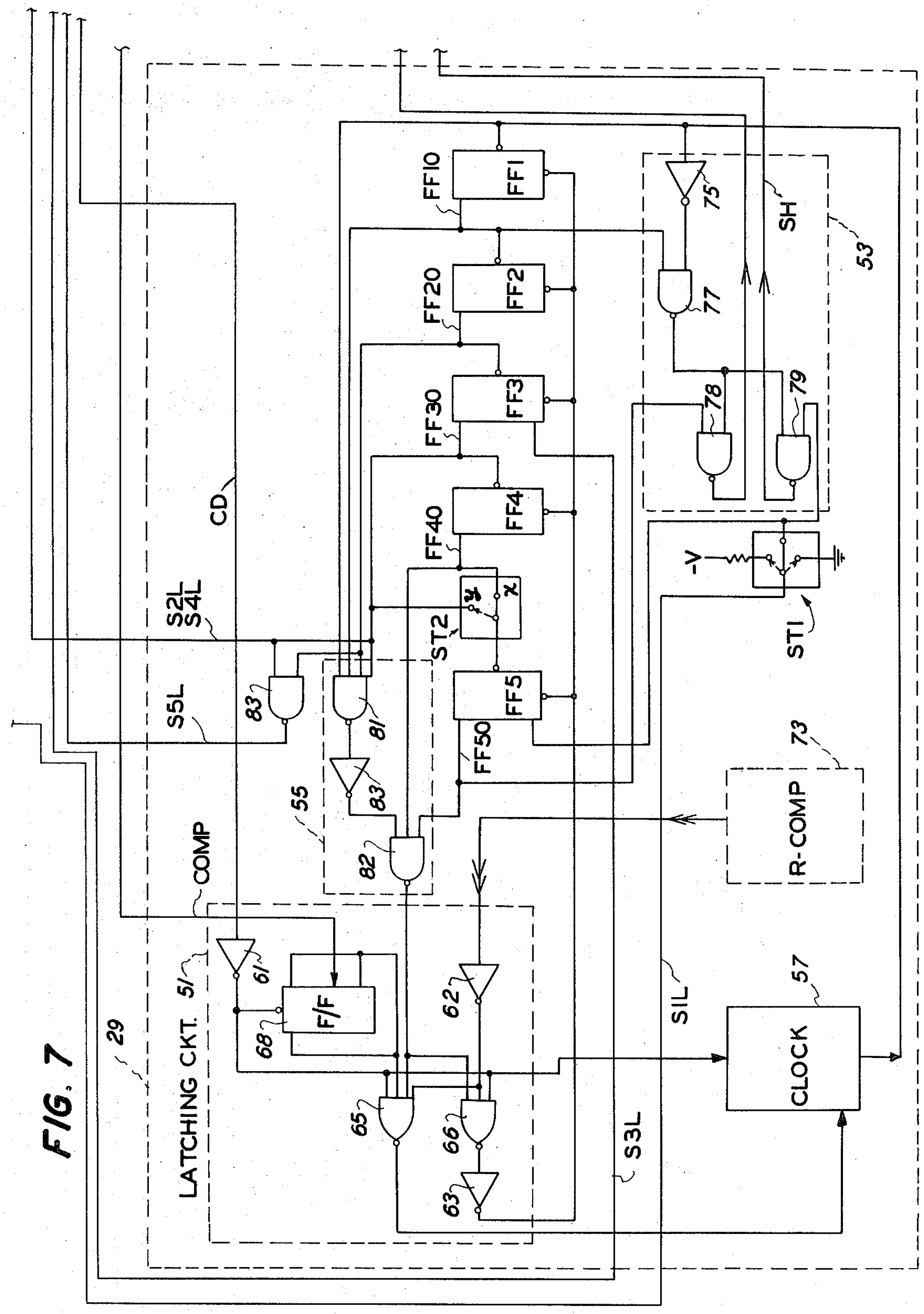
Figures 8, 9A:
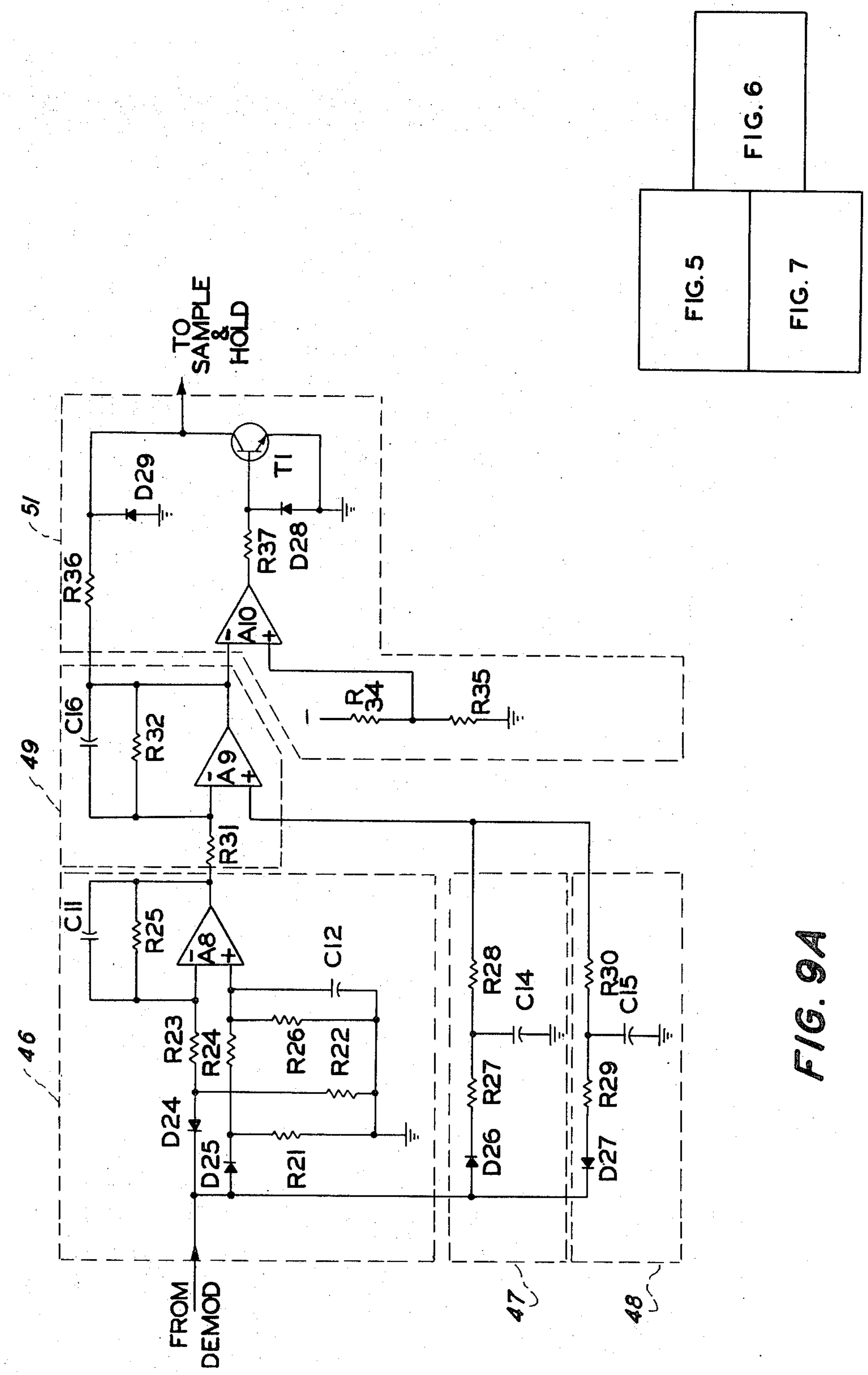
FIG. 8 shows the manner in which the detailed circuits of FIGS. 5, 6 and 7 are combined to form the equalizer shown in block diagram form in FIG. 2.
FIGS. 9A and 9B show two different embodiments of the peak-to-average difference detection circuitry used in the equalizer shown in FIG. 2.

FIGS. 5, 6 and 7 combined in the manner shown in FIG. 8 show the details of certain parts of the equalizer of FIG. 2. The structure and operation of the parts will be first described and then an operation of the equalizer will be described in detail to elucidate further the present invention.

ADJUSTABLE EQUALIZER

As illustrated, the amplifier 25 comprises two operational amplifiers A1 and A2, together with several resistors R1 through R8 and capacitors C1 through C5 operatively associated with the operational amplifiers A1 and A2. The resistors R1—R8 and the capacitors C1—C5 combine with the operational amplifiers A1 and A2 to provide the amplifier 25 with a phase compensated gain versus frequency characteristic similar to the one shown in FIG. 3. The switches S1 through S5 are all of a similar design and each of them typically comprises a pair of field effect transistors FET 1 and FET 2, operational amplifiers A4 and A5, diodes D1 and D2 and resistors R11 and R12 of suitable values connected in the manner shown. In this instance, each of the switches further includes a pair of potential dividing resistors R13 and R14, thereby biasing to the operational amplifiers A4 and A5 to, in turn, bias the field effect transistor FET1 and FET2 into and out of conduction, respectively, under quiescent condidtions. Thus, the switch S1 normally applies the incoming signal from the transmission medium 15 directly to the filter network F1 via a bypass lead 41 and the field effect transistor FET1. The state of the switch S1 is reversed to insert the amplifier 25 into the equalizer 20. To accomplish that, the control logic 29 applies a positive DC voltage to the lead S1L, thereby causing the operational amplifiers A4 and A5 to switch the field effect transistors FET1 and FET2 out of and into conduction, respectively. Under those conditions, the signal carried by the transmission line 15 is routed through the amplifier 25, a lead 42 and the field effect transistor FET 2 to the delay network F1.

Figure 4:
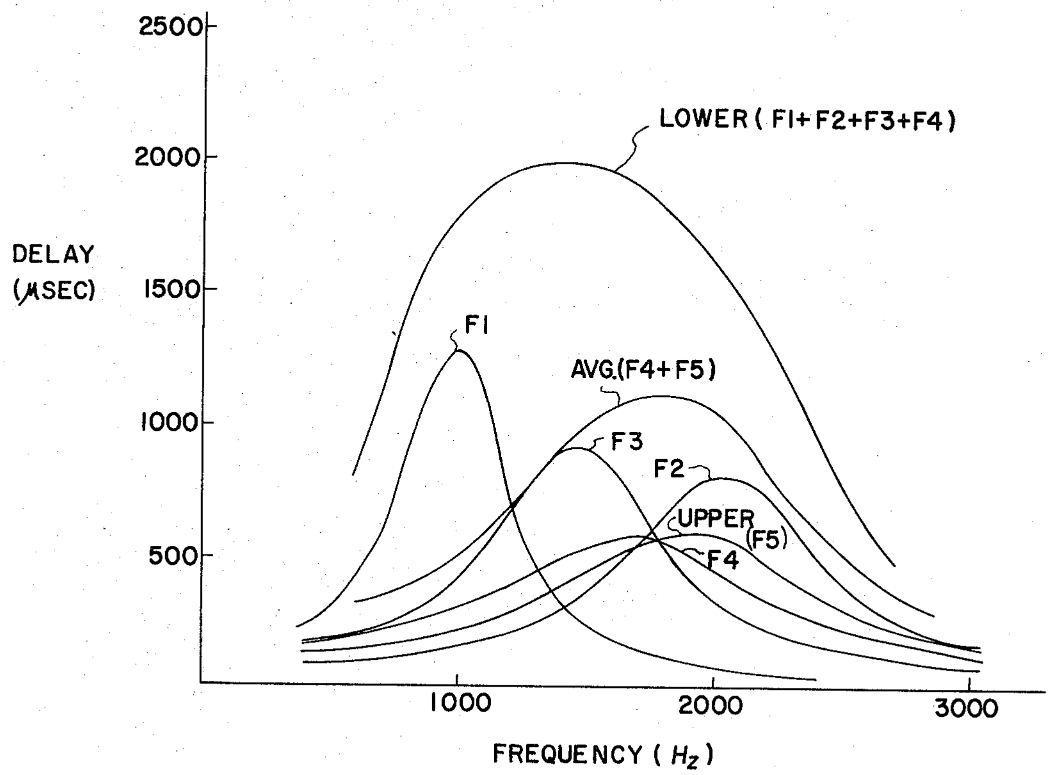
FIG. 4 shows a typical distribution of the delay versus frequency characteristics of the tuned filter networks included in the equalizer shown in FIG. 2.

The delay network F1 is an all-pass network comprised of an operational amplifier A7 and other suitable circuit elements such as resistors R16 through R19 and compacitors C8 through C10 connected in the manner shown to provide a delay versus frequency characteristic such as is illustrated by the waveform F1 in FIG. 4. The other delay networks F2 to F5 may be of similar construction, but their circuit parameters selected to yield a family of different delay versus frequency characteristics as shown by the waveforms F2 to F5, respectively, in FIG. 4. The second and third delay networks F2 and F3 are connected in series tandem with the first delay network F1. As will be seen, the second switch S2 has its normally open or non-conductive input (NO) connected to the delay network output of the third delay network F3 and its normally closed (NC) input connected to the output of switch S1. Under quiescent conditions, therefore, signals appearing at the output of the switch S1 flow around the delay network F1 via a bypass lead 44 and the normally closed input of the switch S2. But, when control logic circuitry 29 applies a positive DC voltage to the lead S2L, the state of the switch S2 is reversed such that signals appearing at the output of the switch S1 are then routed through the delay network F1 and the normally open input of the switch S2 to the fourth delay network F4
In a like manner the remainder of the switches S3, S4 and S5 are connected as shown and they operate such that delay networks F4 and F5 are inserted or omitted from the path of the incoming signal under the command of the switching signals from the control logic circuitry 29 applied through leads S3L, S4L and S5L.

CARRIER DETECTOR, PAD CIRCUITRY, SAMPLE AND HOLD CIRCUITRY AND COMPARE CIRCUITRY

The carrier detector 27 is of a conventional design. It detects the arrival of a valid line signal or test signal pulses at the demodulator 21 and applies the detected carrier signal to the logic control circuitry 29 and the sample and hold circuitry 33 via a carrier detect lead CD in response thereto.

Figure 9B:
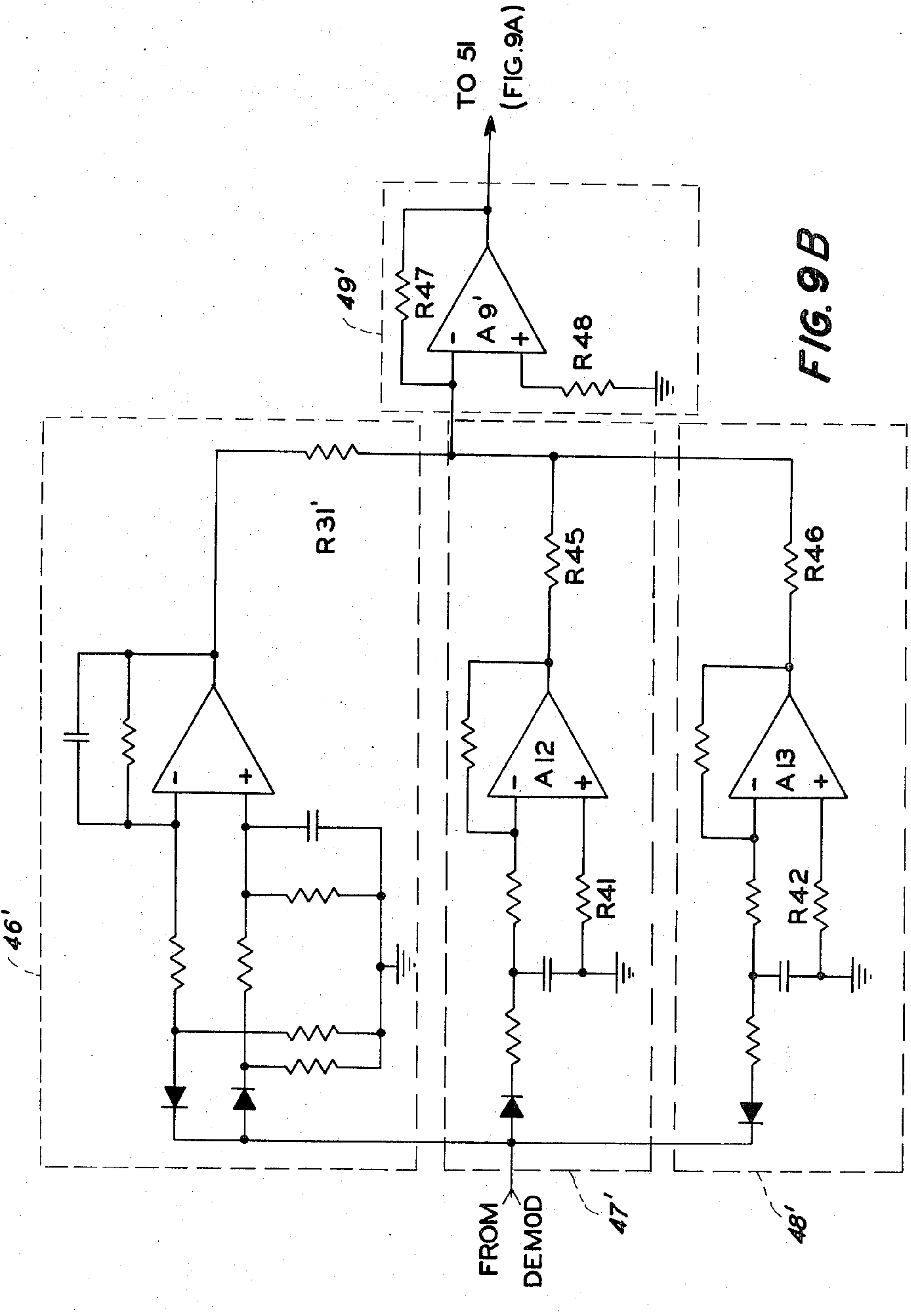

The peak-to-average difference (PAD) detection circuit 31 supplies signals which are representative of the signal distortion existing at the output of the equalizer 20. FIGS. 9A and 9B show two alternative embodiments for this circuit. As shown in FIG. 9A the PAD circuitry includes a full wave rectifier 46 comprised of diodes D24 and D25, an operational amplifier A8 associated with resistive and capacitive elements R21 through R25 and C11 and C12 of suitable values operatively connected to the output of the demodulator 21. The PAD circuitry also includes positive and negative peak detecting 47 and 48, respectively, circuits which are each connected to the output of the demodulator 21. The positive peak detector 47 includes a diode D26, a pair of resistors R27, R28 and a capacitor C14; and the negative detector 48 includes a diode D27, a pair of resistors R29, R30 and a capacitor C15. Additionally, the PAD circuitry is provided with a summing stage 49 comprised of an operational amplifier A9 having its inverting input connected to the rectifier 46 via a coupling resistor R31 and its noninverting input connected to the outputs of the positive and negative peak detectors 47 and 48. Connected in parallel between the output and the inverting input of the amplifier A9 there are a resistor R32 and a capacitor C16. Thus, the amplitude of the signal appearing at the output of the amplifier A9 is a function of the difference between the positive peak K1 and the negative peak K2 and the DC average K3 value of the equalized signal provided by the equalizer 20, e.g., PAD $= f(K1-K2-K3)$. As evident from the comparison of the two waves W1 and W2, the positive peak value K1 is larger for the line least distorted of the equalized signals - i.e., the one most closely approaching an idealized sine $t/t$ impulse response characteristic of a bandwidth transmission line. Consequently the delay network or delay network/amplifier combination which passes the least distorted of the test pulses yields the highest amplitude PAD reading, thereby identifying the optimum equalizer adjustment for the particular transmission line.

It has been found that when the delay distortion may occassionally be sufficiently severe to cause one or more zero crossings of the frequency modulated wave to be missed by the demodulator 29. When that occurs, the PAD circuit 31 receives extremely distorted waveform W3, thereby causing an abnormally high PAD reading which in turn may lead to misidentification of the optimum equalizer adjustment for the particular transmission line. To prevent that there is a threshold detector 51 for grounding the output of the PAD circuitry when the PAD reading exceeds a preestablished level.

Figure 9C:
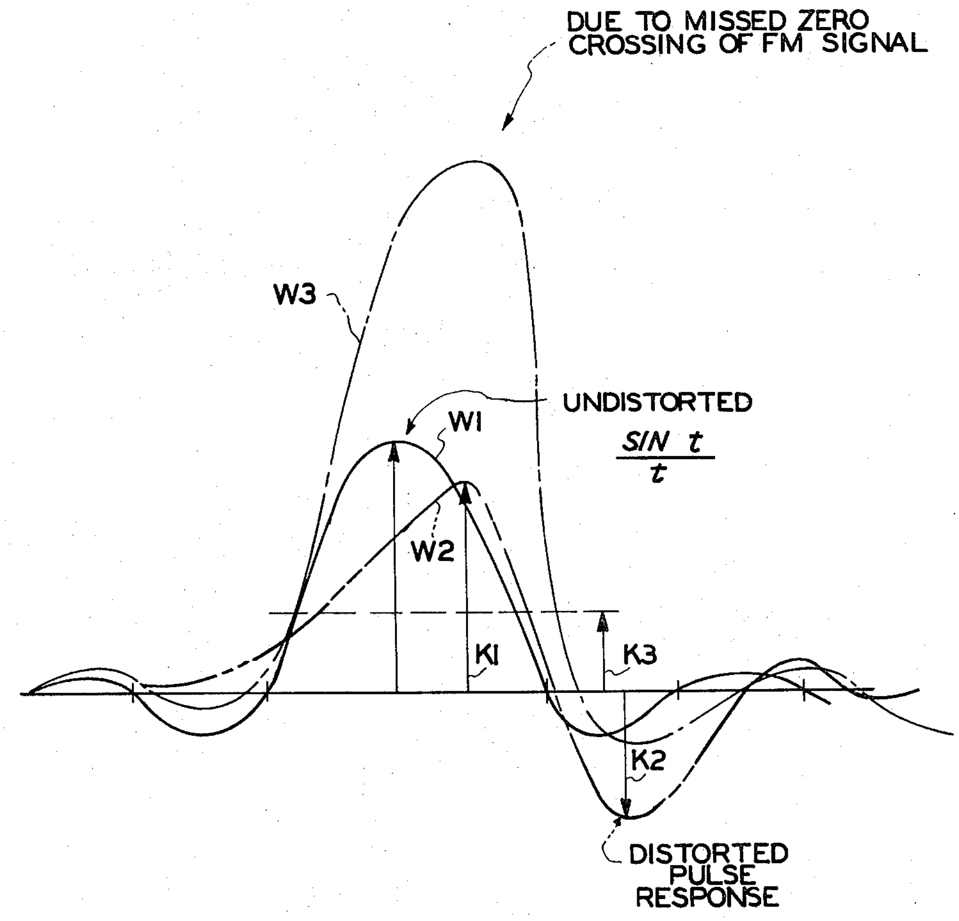
FIG. 9C illustrates the distorted and undistorted amplitude versus time characteristics of the signal received in response to the application of a pulse to a typical limited bandwidth transmission line.

As shown in FIG. 9A, the threshold detector 51 comprises a resistor R36 for connecting the output of the amplifier A9 to the output of the PAD circuit 31. The output of the PAD circuit 31 is returned to ground through a reversely poled diode D29 and the collector-emitter circuit of a normally non-conductive transistor T1 so that it usually follows the output of the amplifier A9 quite closely. That is, however, another operational amplifier A10 which has its inverting input coupled to the output of the operational amplifier A9, its noninverting input connected to a junction between a pair of voltage dividing resistors R34 and R35, and its output coupled by a current limiting a resistor R37 to the base of the transistor T1. Accordingly, if the output signal provided by the amplifier A9 exceeds the magnitude of the threshold voltage established by the voltage dividing ratio of the resistors R34 and R35, the transistor T1 is driven into conduction so that it then effectively grounds the output of the PAD circuit 31. To protect the transistor T1 there preferably is an oppositely poled diode D28 connected in parallel with its base-emitter junction. FIG. 9B illustrates an alternative embodiment of the PAD circuit. This embodiment is essentially the same as the one shown in FIG. 9A, except for the following minor modifications. First, the positive and negative peak detectors 47' and 48' include respective operational amplifier A12 and A13 with separate drift stabilizing resistors R41 and R42 for weighting the contributions of the positive and negative peak signals K1 and K2 to the overall peak-to-average difference signal. As shown in FIG. 9C the summing stage 49' is also arranged somewhat differently in that the outputs of the full wave rectifier 46' and of the positive and the negative peak detectors 47' and 48' are all applied to the non-inverting input terminal of the operational amplifier A9' which, in turn, has its non-inverting input terminal returned to ground through a drift stabilizing resistor R48. The output of the summing stage 49' is then applied to the negative input terminal of the operational amplifier A10 shown in FIG. 9A.

While use of PAD circuitry 31 is indicated, it is to be noted that the present equalizer can use other circuits, such as a peak-to-average ratio detection circuit, for providing a voltage reading more or less linearly related to the distortion of the signals appearing at the output of the equalizer 20.

SAMPLE AND HOLD CIRCUITRY

As shown in FIG. 6, the sample and hold circuitry 33 is comprised of a field effect transistor FET3, a unity gain operational amplifier A16, an operational amplifier A17, a storage capacitor C16, diodes D8, D9, D10 and resistors 51 through 55 operatively connected as shown. The transistor T3 is biased into conduction under quiescent conditions so that its collector-emitter circuit then provides a relatively low impedance path for discharging residual charge on the capacitor C16. But, when a carrier detect signal is supplied by the carrier detector 27, the transistor T3 is switched out of conduction, and the capacitor C16 therefore then tends to charge in response to any current drawn through the field effect transistor FET3 and the diode D8. The field effect transistor FET 3 is switched into and out of conduction under the control of the operational amplifier A17 in response to sampline signals provided by the control logic 29. Thus, the output of the peak-to-average detector 31 is sampled and the most positive of the sampled peak-to-average difference voltages is stored on the capacitor C16. Amplifier A16 is arranged to act as a high impedance buffer between the storage capacitor C16 and the comparator 35. Resistors R51 and R52 divide the output of the unity gain amplifier A16, with the result that the comparator 35 receives a slightly attenuated representation of the maximum peak-to-average difference voltage for comparison against the full scale peak-to-average difference voltage provided by the PAD circuit 31.

COMPARATOR 35

The comparator 35 comprises an open loop operational amplifier A18 and a NAND gate comprised of diodes D13 and D14 together with, a transistor T5. The comparator 35 also includes resistors R56, R57 and R58 as shown for biasing purposes. As will be seen, the operational amplifier A18 has its inverting input coupled to the junction between the resistors R51 and R52 and thus receives the attenuated representation of the voltage stored on the capacitor C16. The non-inverting input of the amplifier A18 is, on the other hand, coupled by a forwardly poled diode D16 to the output of the peak-to-average difference detector 31. Accordingly, whenever the existing peak-to-average difference voltage equals or exceeds the voltage stored on the capacitor C16, there is a positive voltage at the output of the operational amplifier A18 to back bias the diode D14. If that occurs while the control logic 29 is providing an enabling pulse to back bias the diode D13, the transistor T5 switches into conduction such that the voltage at its collector drops from a positive level (i.e., a high logic level) to substantially ground potential (i.e., a low logic level). Such a voltage is sensed by the control logic 29 and is interpreted to indicate that the equalizer 20 has been optimumly matched to the transmission line 15.

CONTROL LOGIC CIRCUITRY

Control logic circuitry 29 is comprised of a latching circuitry 51, decoder 53, a timing chain comprised of a counter made of flip-flops FF1 through FF5, a time-out decoder 55 and a clock 57, as shown in FIG. 7. These circuit elements are operatively connected to apply switching signals to selected ones of the switches S1-S5 in response to the output of the comparator 35 (FIGS. 2 and 6).

Latching circuit 51 includes inverting gates 61, 62, 63, NAND gates 65 and 66 and a flip-flop 68 connected in the manner shown. Two inputs to the flip-flop 68 operate it; one coming directly from the output of the comparator 35 the other coming from the carrier detector 27 via the inverting gate 61. The output of the flip-flop 68 is coupled to one input of the NAND gate 65 which, in turn, has a second input coupled to the output of the time out decoder 55 and a third input coupled to the output of a compatability detector 73. The compatability detector 73 generates a "0" or "1" depending upon whether the equalizer 20 receives test pulses of the aforementioned type via the transmission line 15 or not. if no such test pulses are received, the equalizer 20 is designed to function as a fixed equalizer. This is an advantageous feature which enables the present equalizer to operate with various types of transmission systems. As will be apparent, the high ("1") logic level output provided by the compatability detector 73 when compatability does not exist, causes a low ("0") logic level output signal to be provided by the inverter 62, thereby maintaining the outputs of both of the NAND gates 65 and 66 at high ("1") logic levels. Under those conditions, the control logic 29 inserts a predetermined average attenuation and delay into the equalizer 20.

The flip-flop 68 is set in response to a carrier detect signal from the carrier detector 27 and is reset in response to a low ("0") logic level output from the comparator 35. Consequently, if it is assumed that compatability exists and that a carrier signal is present, it will be understood that the NAND gate 65 is controlled by the time out decoder 55 until the comparator 35 signals that the equalizer 20 has been optimally matched to the transmission line 15. The clock 57 is turned "on" or "off" depending on whether the output from the NAND gate 65 is at a low ("0") logic level or a high ("1") logic level. In a similar manner, the NAND gate 66 is used to serve a logic function to enable or disable flip-flops FF1–FF5. Decoder 53 includes an inverting gate 75 three NAND gates 77–79 operatively connected in the manner shown to generate the compare and sample and hold enable signals in response to the outputs of the flip-flop FF5 and clock 57. The time out decoder 55 includes NAND gates 81 and 82, and an inverting gate 83 interposed between the two NAND gates 81 and 82.

If an equalizer adjust cycle is completed without the appearance of a low ("0") logic level signal at the output of the comparator 35, the equalizer 20 reverts to a failure mode since the time out decoder 55 supplies a low ("0") logic level input signal for the NAND gate 65 to stop the clock 57 upon the expiration of a predetermined time out period. If, however, an optimum match of the equalizer 20 to the transmission line 15 is identified, the output of the comparator 35 drops to a low ("0") logic level, thereby resetting the flip-flop 68 before the time out period expires. When that occurs, the flip-flop 68 applies the low ("0") logic level input signal required by the NAND gate 65 to stop the clock 57. Of course, when the clock 57 stops, there are no further changes in the states of the flip-flops FF1 – FF5 and, therefore, no further changes in the states of the switches S1–S5. Accordingly, when an optimum match of the equalizer 20 to the transmission line 15 is identified, the delay network or delay network/amplifier combination responsible for that match is locked into the equalizer 20. On the other hand, when the attempt to achieve such a match is unsuccessful, the equalizer 20 automatically assumes a predetermined setting with a strap ST1 which makes it possible to connect the switching signal lead S1L for three different modes of operation depending upon whether it is strapped to the ground "voltage" source or to the counter. By strapping the switching signal lead S1L to the voltage source or ground, the switch S1 is maintained at the actuated or released state. When the S1L is strapped to V, the switch S1 inserts the amplifier 25 in the path of the signal and keeps it there. However, with the lead S1L is strapped to the ground, the amplifier 25 is removed from the path of the incoming signal and the switch S1 applies the incoming signal directly to the first delay network F1. The foregoing two options can be advantageously used to keep in or keep out the amplifier 25 to meet the need of a particular transmission line to which the present equalizer is connected. With the S1L strapped to the output of the flip-flop FF5 of the counter as shown the insertion of the amplifier 25 into the signal path depends upon the condition of the particular characteristics of the transmission line to which the present equalizer is connected. The strap ST2, which is connected between the two flip-flops FF4 and FF5 as shown, establishes the maximum number of positions or combinations of the delay filter networks that can be inserted in the signal path shown ($y$). Thus by changing the strap from the one shown ($x$) to another position shown ($y$), the number of combination is reduced to four.

THE OPERATION OF THE EQUALIZER

The equalizer described above operates as follows. Briefly stated, the equalizer adjust cycle is divided into two parts, each of which is associated with a respective set or train of test pulses. During the first part of the cycle, the peak-to-average detector 31 measures the PAD readings afforded by inserting different ones of the delay networks and delay network/amplifier combinations in series with the transmission line 15 in timed synchronism with successive ones of the test pulses. The logic circuit 29 enables the sample and hold circuit 33 in timed synchronism with the test pulses to store the highest PAD reading. Thus, the peak-to-average difference voltage associated with the particular delay network or delay network/amplifier combination that reduces the test pulse distortion to the lowest level during the first part of the cycle is retained. During the second part of the equalizer adjust cycle, the delay networks and delay network/amplifier combinations are again inserted into the equalizer 20 in timed synchronism with successive test pulses. But, during this part of the cycle, the logic circuit 29 enables the comparator 35 is timed synchronism with the test pulses such that the successive PAD readings are now compared against the one stored by the sample and hold circuit 33. Upon detection of a PAD reading which equals or exceeds the stored PAD reading, the comparator generates an output, thereby latching the delay network or delay network/amplifier combination responsible for that reading into the equalizer 20. In this manner the particular delay network or delay network/amplifier combination that provides optimum equalization is selected and inserted into the path of the incoming signals. In addition, the equalization apparatus of the present invention includes various optional features which render it very flexible and versatile.

Figure 10:
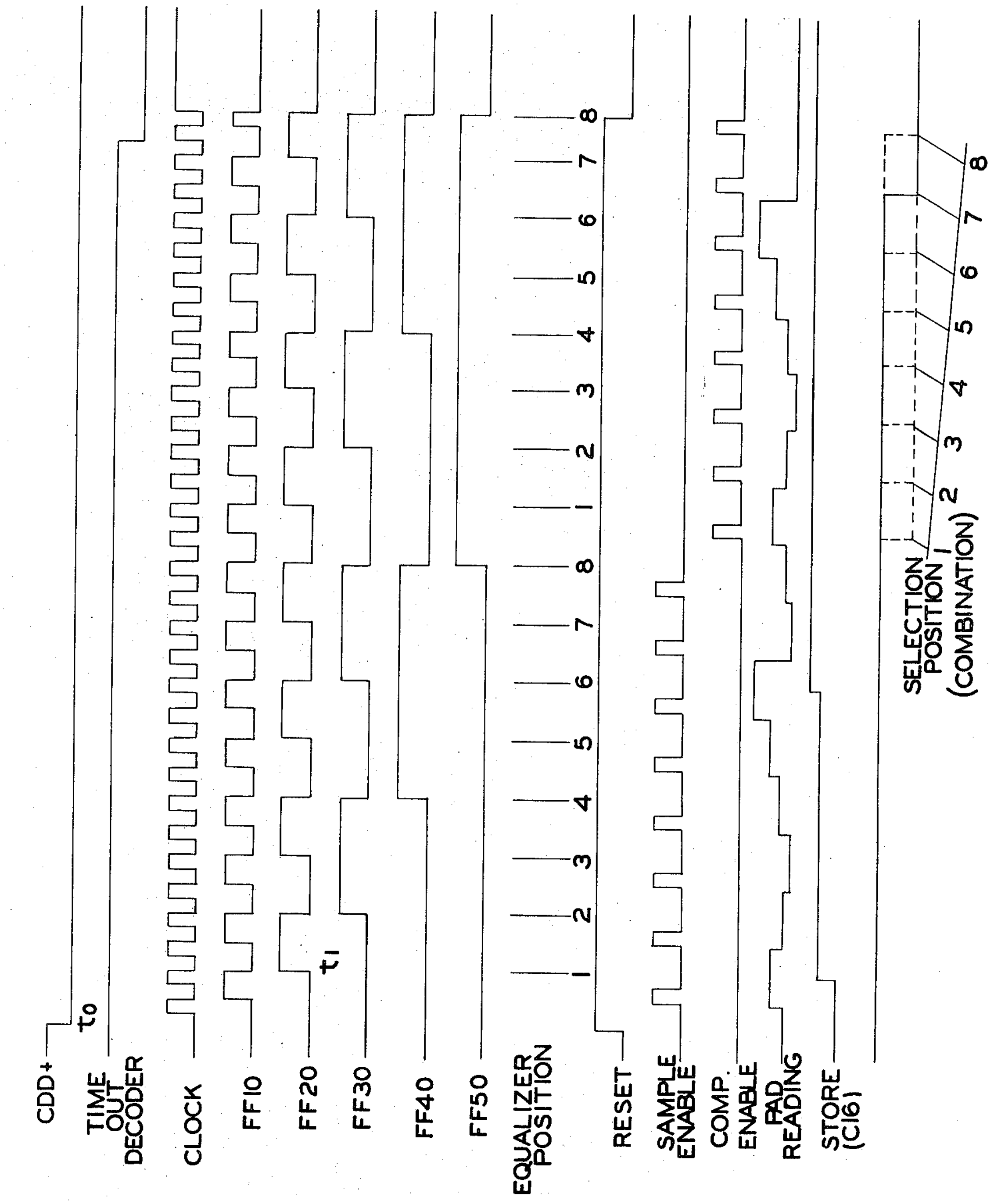
FIG. 10 shows the waveforms appearing at various locations in the equalizer shown in FIGS. 5, 6 and 7.

Now a detailed description of the operation of the equalizer in conjunction with the timing waveforms shown in FIG. 10 follows. Initially, the "compatability" detector 73 (FIG. 7) determines whether the associated transmission system or transmitter is compatible with automatic adjustment of the equalizer 20 or not. When a non-"compatible" situation is detected, the detector 73 applies a high ("1") logic level input signal to the inverting gate 62. This prevents NAND gates 65 and 66 from operating the clock 57 and the counter FF1–FF5. In turn, this modifies the mode of operation of the comparator and the adjustable equalization network such that they provide a pre-established fixed level of amplifier and delay equalization to the incoming signal.

In contrast, if the receiver is connected to a transmitter which does provide the test pulses (i.e., if compatability exists), the compatability detector 73 generates a low ("0") logic level signal so that the inverting gate 62 applies a high ("1") logic level input signal to the NAND gates 65 and 66 (FIG. 7).

At about the same time that the compatability determination is made, the carrier detector 27 detects the arrival of a valid line signal from the demodulator 21 and generates a carrier detect signal CDD. As shown in FIG. 10, the appearance of a carrier detect signal is marked when when the output of the carrier detector 27 changes from a high ("1") logic level to a low ("0") logic level where it remains for the balance of the equalizer adjust cycle time period as shown by the waveform CDD. In response to the low logic level of the carrier detect signal CDD, the inverting gate 61 of the latching circuitry 51 applies a high ("1") logic level input signal to the flip flop 68, the NAND gates 65 and 66, and the clock 57. At this point in time, that is, at time $t_o$ as shown in FIG. 10, the output from the NAND gate 82 of the time out decoder 55 is at a high ("1") logic level because the flip-flop FF5 (FIG. 7) is in its reset state and is, therefore, causing a low ("0") logic level signal to appear on the lead FF50. Briefly reviewing, to commence an equalizer adjust cycle, all four inputs to the NAND gate 65 must be at a high ("1") logic level or, in other words, the following conditions must all exist:

1. the receiver in which the present equalizer is utilized must be coupled to a "compatible" transmitter, i.e., one which provides the necessary test pulses.

2. the comparator 35 must still be seeking the optimum equalization setting for the particular transmission line.
3. the time out decoder 55 must still be running, and
4. the carrier detector 27 must have sensed that carrier signals are present.

When the foregoing conditions are all satisfied at, say, time $t_o$ (FIG. 10), the NAND gate 65 supplies a low ("0") logic level input signal for the clock 57 which, in turn, causes the clock 57 to supply a series train of clock pulses i.e. clock (FIG. 10).

At time $t_o$, the output of the NAND gate 66 also drops to a low ("0") logic level, thereby causing the inverting gate 63 to supply a clear or direct reset for the flip-flops FF1–FF5. As will be appreciated, the low ("0") logic level output from the NAND gate 66 signifies that the following three conditions exist simultaneously:

1. "Compatability" has been confirmed by the detector 73
2. the carrier detector 27 has detected incoming carrier signals, and
3. the time out period of the time out decoder 55 is still running.

The clock 57 supplies an uninterrupted train of clock pulses as long as the output of the NAND gate 65 remains at a low ("0") logic level, and the counter formed by the flip-flops F1–F5 continues to cycle in response to these clock pulses as long as the output of the NAND gate 66 remains at a low ("0") logic level. Hence, as may be confirmed by an inspection of FIGS. 5–7 and 10, the switches S1-S5 are selectively operated in response to each of the first 8 clock pulses of each equalizer adjust cycle to provide the following settings for the equalizer 20 (binary notation is used in the following table to indicate the logic levels of the control signals applied to the switches S1–S5 by the control logic 29 and the delay characteristics of the equalizer 20 in its various settings are stated in terms consistent with those used in FIG. 4);

characteristic. For example, the amplifier 25 and the filters F4 and F5 may be the first combination tested. In that event, of course, the equalizer setting during the $t_o$ - $t_1$ time period can be expressed in terms of the foregoing table as $a$ + Avg. As will be seen the decoder 53 supplies a sample enabling signal SAMPLE-ENABLE (FIG. 10) for the operational amplifier A17 of the sample and hold circuit 33 during that period. In response, the operational amplifier A17 and the diode D10 apply the sample enable signal to the gate of the field effect transistor FET3. Hence, the field effect transistor FET 3 then provides a path for current flow from the output of the PAD detector 31 to the sample and hold circuit 33, provided that the PAD reading is sufficiently positive to forwardly bias the diode D8.

Diode D8 insures that the capacitor C16 stores the most positive of the successive PAD readings at the conclusion of the first half of the equalizer adjust cycle. Thus, suppose that the most positive PAD reading is obtained in response to the seventh test pulse, as shown in FIG. 10. In that event, it is that reading which appears on the storage capacitor C16 as the second half of the equalizer adjust cycle starts. As may be confirmed by referring to the equalization characteristic chart shown above and to FIG. 4 this means that the best or most effective equalizations happens to be provided in this instance while all of the switches S1 through S2 are inactivated or, in other words, while only the filter F1 is in the signal path.

During the second half of the equalizer adjust, the decoder 53 supplies a disabling signal for the sample and hold circuit 33 and periodic COMP-ENABLE pulses for the comparator 35. The COMP-ENABLE pulses forwardly bias the diode D13 to enable the comparator 35 in timed synchronism with the successive test pulses. Hence, to carry out the adjustment of the equalizer 20, the different delay network and delay network/amplifier combinations are once again inserted into the equalizer in time synchronism with successive test pulses and the PAD readings provided by the PAD detector 31 in response to those test pulses are compared in the comparator 35 against the reading previously

| Clock pulse number | Switches S1 | S2 | S3 | S4 | S5 | Equalizer includes | Characteristics |
|---|---|---|---|---|---|---|---|
| 1 | 1 | 0 | 1 | 0 | 0 | $\underline{a}$+F4+F5 | $\underline{a}$ plus avg. |
| 2 | 1 | 1 | 1 | 1 | 0 | $\underline{a}$+F2+F3+F4+F5 | $\underline{a}$ plus lower. |
| 3 | 1 | 0 | 0 | 0 | 0 | $\underline{a}$+F5 | $\underline{a}$ plus upper. |
| 4 | 1 | 1 | 0 | 1 | 1 | $\underline{a}$ | $\underline{a}$ plus none. |
| 5 | 0 | 0 | 1 | 0 | 0 | F1+F2 | Avg. |
| 6 | 0 | 1 | 1 | 1 | 0 | F2+F3+F4+F5 | Lower. |
| 7 | 0 | 0 | 0 | 0 | 0 | F5 | Upper. |
| 8 | 0 | 1 | 0 | 1 | 1 | | None. |

As shown in FIG. 9, the output of the carrier detector 27 is coupled to the sample and hold circuit 33 via the diode D9. Thus, under quiescent conditions the transistor T3 drains any residual charge that may remain on the storage capacitor C16 from the previous operation. If the presence of a carrier signal is confirmed by the carrier detector 27 at time $t_o$, the carrier detect signal CDD (FIG. 10) drops to a low ("0") logic level at that time, thereby initiating an equalizer adjust cycle. At the onset of the cycle and until some later time $t_1$, the equalizer 20 is adjusted to have a first equalization stored in the capacitor C16. The process continues through the different delay network and delay network-/amplifier combinations until a PAD reading which equals or exceeds the reading stored on the capacitor C16 is obtained. When such a reading is obtained, the polarity of the output signal from the operational amplifier A18 is reversed, thereby reversely biasing the diode D14 to, in turn, cause the transistor T5 to switch from its nonconductive state to its conductive state. When that occurs, of course, the voltage at the collector of the transistor T5 drops from a relatively high DC level toward ground, thereby providing a transistion in the comparator output signal to mark the desired equalizer setting for the logic circuit 29 (FIG. 7). As will be understood, the point at which such a transistion occurs depends on the particular delay network or delay network/amplifier combination which provides the optimum equalization for the given transmission line 15.

In response to the compare aforementioned transistion in the comparator output signal, the signal applied to the NAND gate 65 by, the flip-flop 63 drops from a high ("1") logic level to a low ("0") logic level. This in turn forces the output from the NAND gate 65 to change to a high ("1") logic level, thereby causing the clock 57 to stop. Hence, the flip-flops FF1 through FF5 are then latched in their existing conditions or states and to preclude further changes in the states, in the form of DC voltage, to the corresponding switching of the switches S1–S5. In the foregoing manner a combination of the amplifier and delay networks that will provide best equalization is selected and inserted into the signal path to minimize the frequency dependent amplitude attenuation and phase delay.

FLEXIBILITY OF LOGIC CIRCUITRY

The examples discussed above assume that the equalizer operates in its normal mode; i.e., with the equalizer adjust cycle culminating with equalizer 20 set to present to the end that the delay network or delay network/amplifier combination which affords the best equalization for the given transmission line 15 in the signal path. But there are situations where only a certain predetermined amount of delay and/or attenuation is necessary. The present equalizer provides the necessary flexibility to accommodate this need. For example, as stated before, if the transmitter happens to be an "incompatible" type, the equalizer 20 automatically functions as a fixed equalizer. The high ("1") logic level signal provided by the compatability detector 73 when such "incompatability" exists is applied to the latching circuit 51, thereby preventing normal operation of the logic circuitry, the PAD circuitry, the sample and hold circuitry and the comparator. When that occurs, the equalizer 20 is preset so that, say the amplifier 25 and the filter networks F4 and F5 are inserted into the signal path to provide "AVG" amount of the delay versus frequency characteristics as shown by the waveform F4 + F5 of FIG. 4.

The equalizer of the present apparatus includes additional flexibility in that by simply strapping the first switching signal lead S1L to the ground lead, the amplifier 25 is precluded from being inserted into the incoming signal path. Similarly, by strapping the strap ST1 to the potential source V through the current limiting resistor, the switches S1 is activated and thereby the amplifier 25 is precluded from being removed from the signal path. The present equalizer also introduces the following flexibility: With the use of the strap ST2 the basic eight position equalizer can be modified to become a four position delay equalizer with or without the frequency dependent attenuation available from the amplifier 25. This is accomplished by merely strapping the input of the fourth flip-flop FF4 to that of fifth flip-flop FF5 as shown by the dotted line in the strap circuit ST2.

MODIFIED LOGIC CIRCUITRY

FIGS. 11 through 15 connected as shown in FIG. 16 illustrate another embodiment of the logic circuit for the equalizer 20. This embodiment permits the equalizer 20 to be adjusted in a single pass to include the optimum delay network or delay network/amplifier combination for the given transmission line 15. Generally stated, the modified logic circuitry comprises a logic activating circuit (FIG. 11) an equalization position circuit (FIG. 12), a buffer memory (FIG. 13), a priority decoder network (FIG. 14), and switch control gates (FIG. 15) connected in the manner as shown. These circuitries are designed and operatively connected so that once the equalizer adjust cycle commences, the switch control gates SG1, SG2, SG4 and SG5 apply switching signals to the switches S1 through S5. The PAD circuitry derives the PAD signals, and the sample and hold circuit 33 stores the most positive of those readings, all as previously described. The logic is adapted to supply compare enable signals for the comparator 35 so that the latter compares each succeeding PAD reading against the reading stored by the sample and hold circuit 35, and the buffer memory registers the results of this series of comparisons. Finally, at the conclusion of the equalizer adjust cycle, the priority decoder decodes the signal stored in the buffer memory, and actuates selected ones of switch control gates SG1, SG2, SG4 and SG5. Accordingly, the switches S1–S5 are then selectively operated so that the optimum delay network or delay network/amplifier combination for the particular transmission line is inserted into and retained by the equalizer 20 for the balance of the transmission period.

Figure 11:
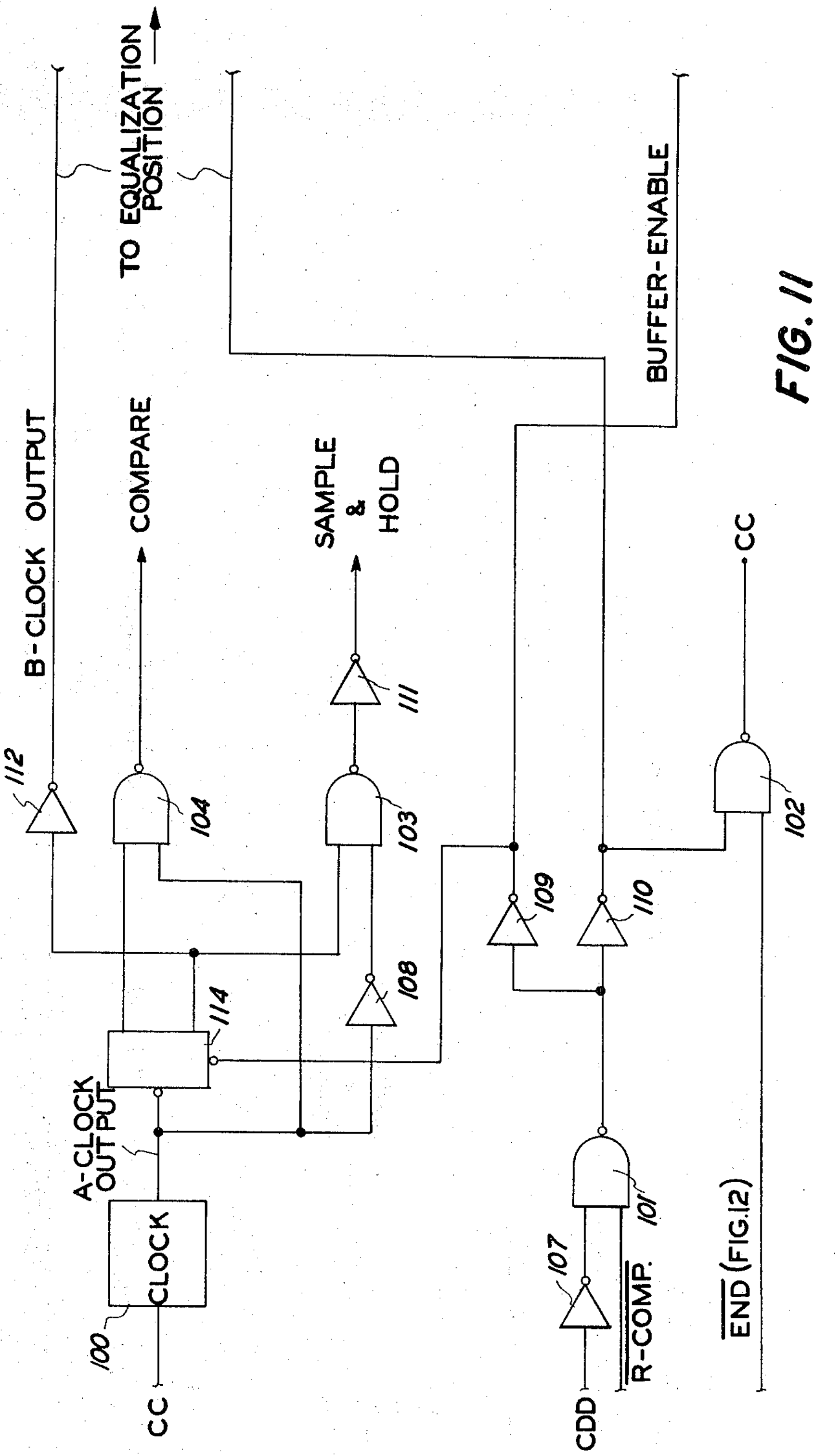

Now referring to the details FIG. 11 shows the logic activating circuitry as having a clock 100, NAND gates 101 through 104, inverting gates 107 through 112 and a flip-flop 114 operatively connected in the manner shown to provide the following functions. As soon as the carrier detect signal CDD is applied to the logic activating circuitry, the inverting gate 107, the NAND gate 101 and the inverting gate 110 enable the NAND gate 102 to prepare the operation of the clock 100. There is a transistion in the logic level of the output signal supplied by the NAND gate 102 at this point because the lead END output (FIG. 12)) starts out at a high ("1") logic level. Hence, the clock 100 is triggered at the outset of each equalizer adjust cycle to provide a series of A-CLOCK pulses a shown in FIG. 17B. The A-CLOCK pulses clock the flip-flop 114, and the output of the flip-flop 114 is inverted via the invert gate 112 and applied in the form of B-CLOCK pulses to the flip-flops SR1 through SR9 of the equalization position circuitry. The flip-flops SR1 through SR9 respectively provide timing pulses E1 through E8 at their reset output leads. The timing pulses are applied to the switch control gates SG1, SG2, SG4 and SG5 to activate the switches S1–S5 in succession in different combinations as shown, for example in the chart shown above. During the equalizer adjust cycle, the flip-flop SR9 applies a low (" 0") logic level input signal to the NAND gates P1 through P8 of the priority decoder network shown in FIG. 14 to disable the gates P1 through P8. But, after the last test pulse has been received, the flip-flop SR9 is clocked and therefore then supplies a high ("1") logic level input signal for the NAND gates P1–P8 thereby freeing them to selectively operate the switch control gates SG1, SG2, SG4 and SG5. Hence, while the test pulses are being received, the switch control gates respond to the output signals from the flip-flops SR1 through SR8 such that the equalizing effects of the different delay networks and delay network/amplifier combinations are serially tested. After the last test pulse has been received, the decoder (FIG. 14) operates to identify and select the delay network at delay network/amplifier combination that gives the best equalization for the particular transmission line.

Figure 12:
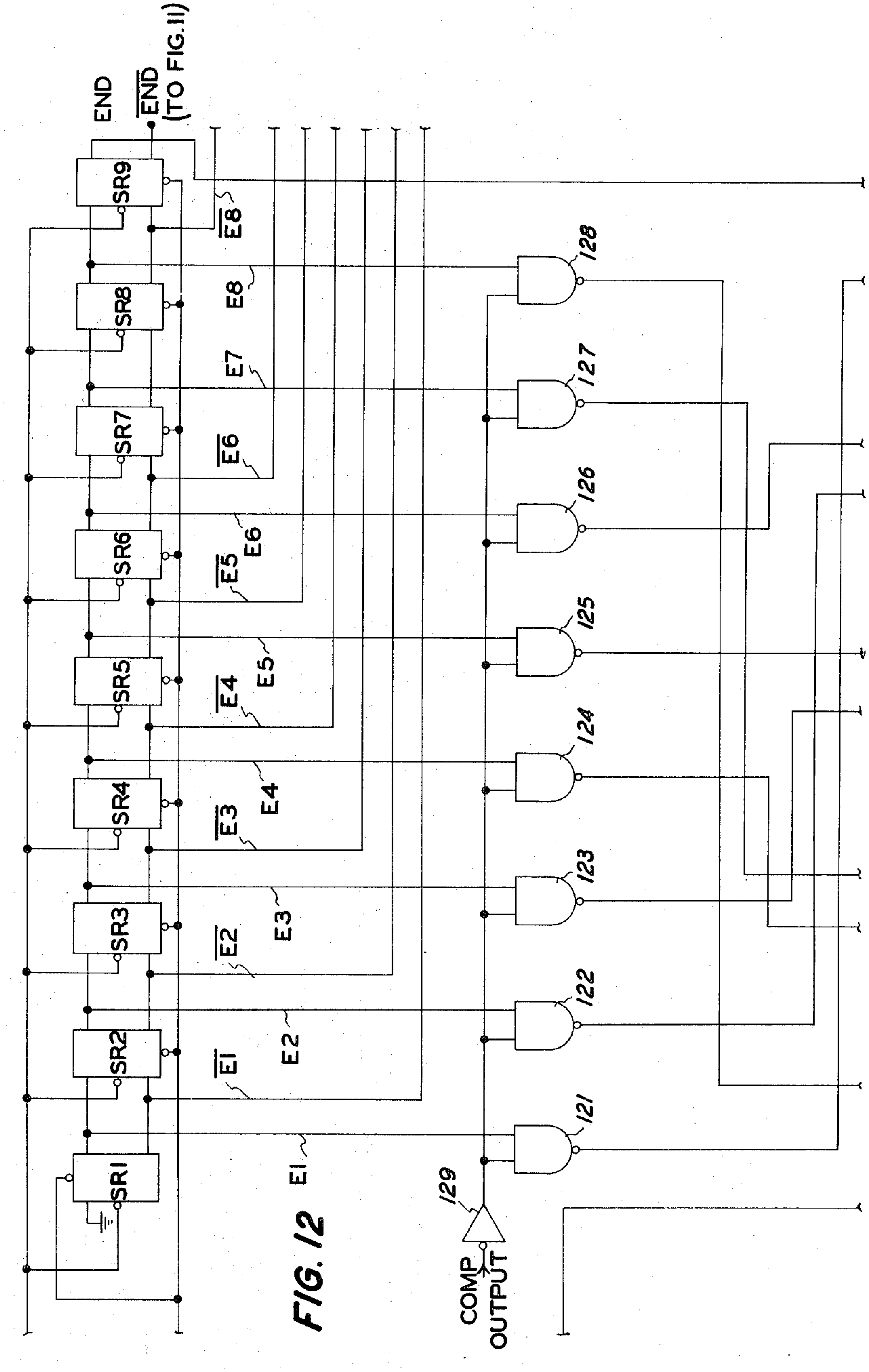
Figure 13:
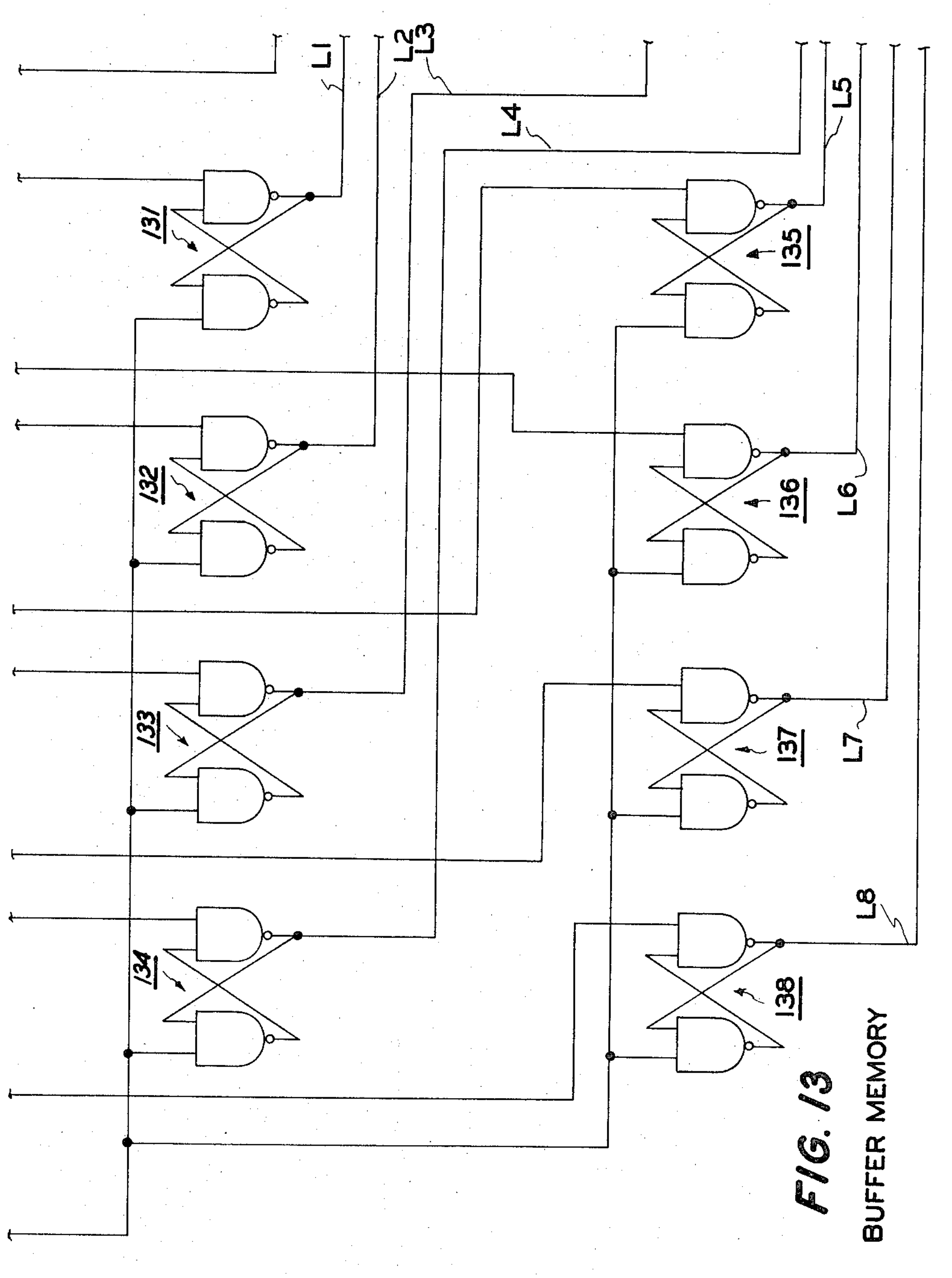
Figure 14:
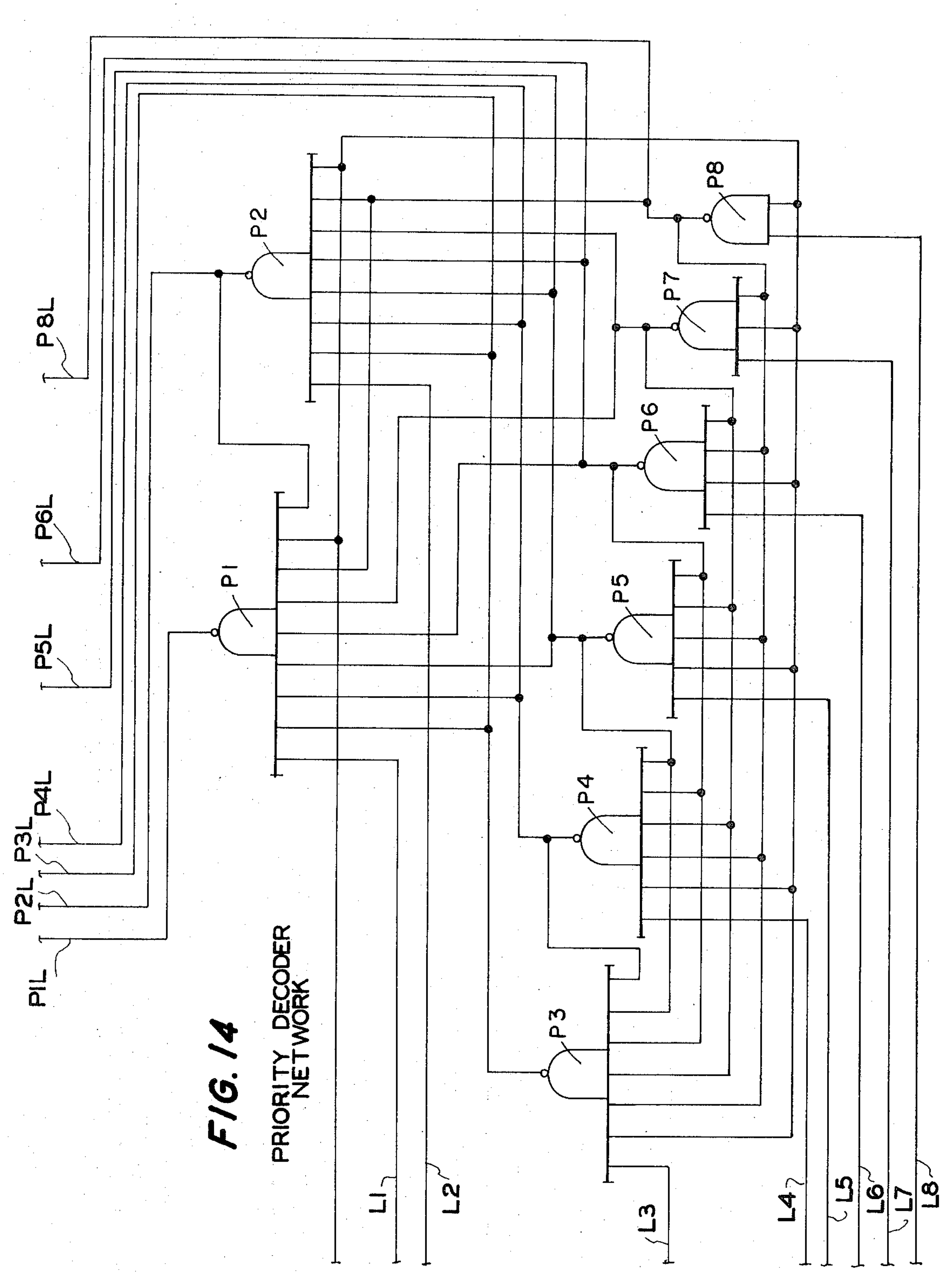
Figure 15:
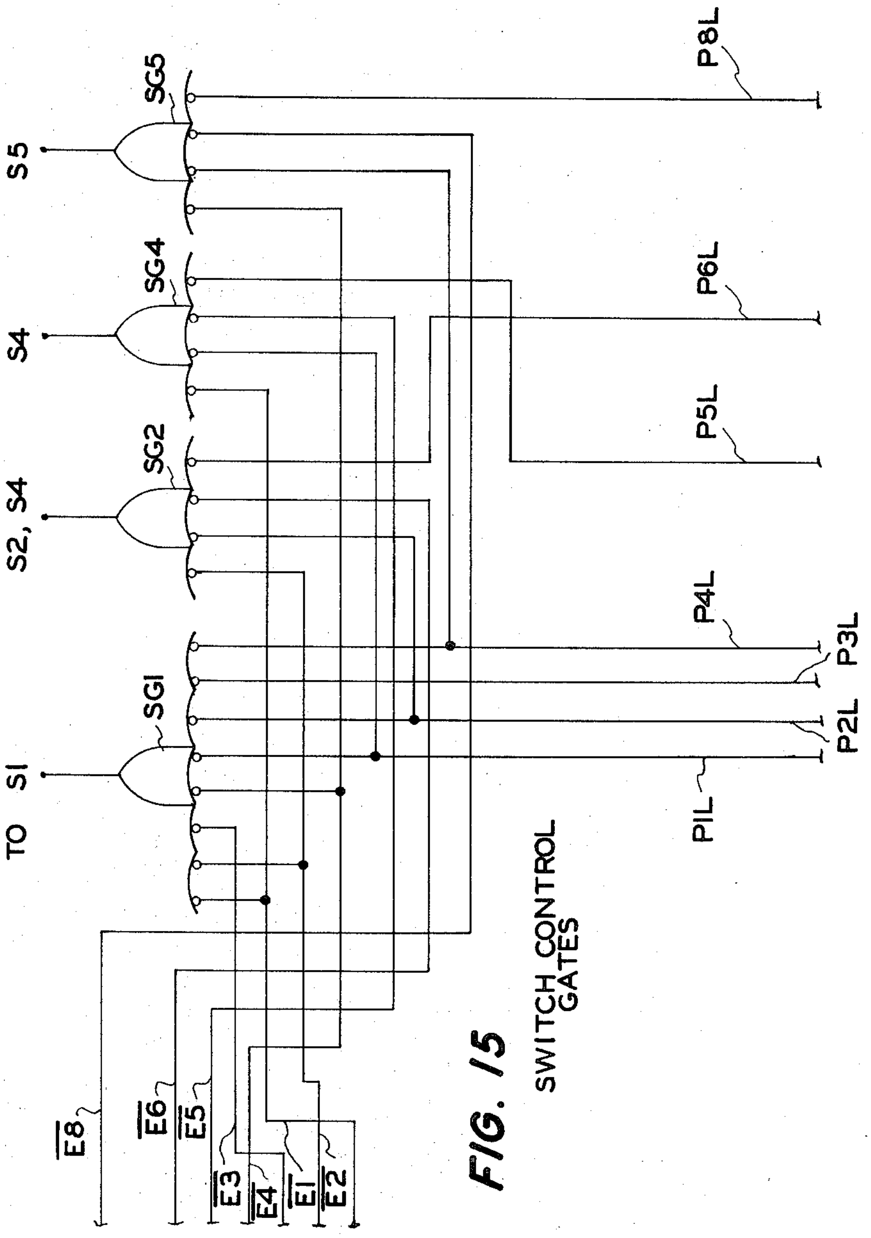

The logic activating circuitry of FIG. 11 provides other logic signals as follows. The inverting gate 108, the NAND gate 103, and the inverting gate 111 provide the sample and hold enabling signals (FIG. 17B) in response to the clock pulses from the clock 100 and applies them to the sample and hold circuitry. The counter enabling signal is derived from the output of the invert gate 110 which is activated by the carrier detect signal CDD via the invert gate 101 and the NAND gate 101. As shown in FIGS. 12 and 13 the output from the set terminals of the flip-flops SR1–SR8 are applied to the buffer memory (FIG. 13) through a plurality of NAND gates 121 through 128. The NAND gates 121 through 128 are driven by the output of the comparator via an inverting gate 129. The buffer memory comprises a plurality of pairs of cross coupled NAND gates 131–138. Each of these pairs has one gate connected to a corresponding one of the NAND gates 121 through 128 and its other gate connected to the output of the inverting gate 107. During the equalizer adjust cycle, the logic activating circuitry applies buffer enabling signal, BUFFER-ENABLE, to set the cross-coupled gates. Coincident inputs from the flip-flops SR1–SR8 and the comparator output reset corresponding ones of the cross-coupled NAND gates and thereby identify the particular delay network or delay network amplifier combination which provides the most effective equalization. Stated in terms of the PAD readings, this means that the equalizer is adjusted to the setting which provides the most positive PAD reading. The output signals from the buffer memory are applied to the NAND gates P1 through P8 of the priority decoder network. However, while the test pulses are being received, these signals do not affect the state of the NAND gates P1 through P8 since those gates are then disabled by the low ("0") logic level signal appearing at the set terminal of the last flip-flop SR9 of the equalization position circuitry. However, the flip-flop SR9 is switched to a set state in response to the trailing edge of the last test pulse such that the output signal appearing at the set terminal of the flip-flop SR9 changes thereby supplying a high ("1") logic level input signal for the NAND gates P1 through P8. Accordingly, those gates then come under the control of the buffer memory, with the result that the switch control gates SG1, SG2, SG4 and SG5 are then operated to selectively set the switches S1–S5 as necessary to insert and maintain the most effective delay network or delay network/amplifier combination in the equalizer 20 for the balance of the transmission period.

More specifically, for illustration, suppose the different combinations of the amplifier and the filter networks provide either different PAD readings as indicated by the PAD waveform in FIG. 17A. The succeeding ones are compared to the preceding ones and whenever the succeeding ones equals or exceeds the preceding ones, the storage capacitor C16 of the sample and hold circuitry stores the succeeding PAD reading. This is shown by the waveform STORE in FIG. 17A. In turn, the comparator generates an output signal whenever the succeeding one equals or exceeds the preceding one at the corresponding time slots signifying the equalization positions or combinations, which turn out to be positions 1, 2, 4 and 6 for the above example. Thus, in this example the first, second, fourth and sixth cross-coupled NAND gates 131, 132, 134, 136 of the buffer memory (FIG. 13) are reset. Accordingly at the end of the cycle, the decoder applies the output of the buffer in the form of 11010100 to the corresponding NAND gates P1–P8. In response the NAND gates P1 through P8 generate through their outputs leads P1L through P6L and P8L a signal pattern having 111110–1. In response to this output the switch control gates provide switching output signals. In response, the second switch control gates SG2 provides a DC potential or a switching signal and actuate switches S2 and S4. The outputs of the first and third and fourth switch control gates SG1, SG3 and SG4 remain at a low ("0") logic level such that the switches S1, S3 and S5 are deactivated. Consequently, the logic control circuitry as shown in FIGS. 11 through 15 provides a delay equalization corresponding to the sixth position or LOWER amount of equalization as indicated in the table shown above. Here it is to be noted that the delay networks and switches are so connected that with the actuation of the switch S4, the filter F5 is completely bypassed by the loop that connects the output of the fourth filter F4 to the switch S4. Thus, the operation of switch S3 plays no part, i.e., activation and deactivation of S3 plays no part when the switches S2 and S4 are activated.

Various other modifications may be made to the equalizer of the present invention without departing from the teachings of the present invention. Thus, for example, as shown in FIG. 18, the adjustable equalizer may be arranged to comprise a plurality of parallel delay networks FA through FD, each connected in series with a respective field effect transistor switch SA through SD. In addition, if necessary, amplifiers *a*1 and *a*2 having suitable gain versus frequency characteristics of the type shown in FIG. 3 may be inserted in series with the delay networks by means of switches S*a*1 and S*a*2. Suitable control means comprising the PAD circuitry, the control logic 151 and other circuitries of the type described above may be used to activate different combinations of the switches SA-SD and Sa1–Sa2 in succession in response to a series train of incoming test pulses and select a particular FA through FD which will provide the best equalization to the incoming signal. Various embodiments of the present invention described above are used for the purpose of illustrating the spirit and scope of the present invention. Accordingly, they should not be construed to limit but to illustrate the scope of the invention set forth in the accompanying claims.

What is claimed is:

1. An adjustable equalizer for use in a receiving means of a transmission system for correcting frequency dependent distortion introduced into the incoming signal pulses by the transmission medium, comprising:

an adjustable equalization means including a plurality of all-pass delay networks having different delay versus frequency characteristics; and control means for selecting and identifying a particular combination of said delay networks which provides best equalization and enabling said adjustable equalization means to insert said particular combination into the path of the incoming signal pulses.

2. The equalizer according to claim 1 wherein said control means includes:

means for sequentially inserting different combinations of said delay networks in different combinations into a path provided for the incoming signal pulses;

means for determining the amounts of distortion of the signals caused by the insertion of each of said combinations and for generating separate output signals indicating the amount of distortion caused by each of said combinations;

means for selecting the one distortion indicating signal which represents the least amount of distortion to thereby identify the particular combination of delay networks which provides the best equalization.

3. The equalizer according to claim 1, including means for detecting a mode identifying signal from the received signal, and means responsive to said mode identifying means for enabling said control means to insert particular ones of delay networks that provide a fixed delay versus frequency characteristics without the selection process.

4. The equalizer according to claim 1 including, at least one frequency dependent amplifier, means for selectively inserting said amplifier into the path of the incoming signal to equalize substantially the frequency dependent amplitude attenuation introduced by the transmission medium.

5. The equalizer according to claim 4 said control means and said switching means are arranged to connect said amplifier and said delay networks in parallel.

6. The equalizer according to claim 4, including a plurality of switching means for use by said control means in inserting said amplifier and said plurality of delay networks in different combinations into the path of the incoming signals.

7. The equalizer according to claim 6, wherein said switching means includes a pair of field effect transistors arranged in a single throw double pole configuration.

8. The equalizer according to claim 6, said control means and said switching means are arranged to connect said amplifier and said delay networks in series.

9. The equalizer according to claim 1, wherein said distortion measuring means includes means for comparing the peak values of the distorted wave to its DC average value and for generating a DC voltage representing the difference between the peak values and the DC average value as a measure of the delay distortion.

10. The equalizer according to claim 9 wherein said means for determining the amount of distortion includes means for detecting and producing a positive peak value, a negative peak value, and an average value from said distorted signal, and means for producing a peak-to-average difference from said positive and negative peak values and said average value, with the peak-to-average difference representing the positive peak value, less the negative peak value and the average value.

11. An adjustable equalizer for use in a transmission system for correcting the incoming sequence of pulses in series subjected to frequency dependent distortions by the transmission medium, comprising:

a plurality of delay networks having different delay versus frequency characteristics;

means for inserting a plurality of different combinations of said delay networks in succession into the path of the incoming signal in synchronization therewith;

means for obtaining a measure of the amount of the frequency dependent distortions introduced by said plurality of different combinations of delay networks in series with the transmission medium; and means for selecting a combination of said delay networks which provide least amount of frequency dependent distortions and latching said combination into the path of the incoming signal for providing an optimum equalization.

12. The equalizer according to claim 11, further including switching means interposed between different pairs of said delay networks, a demodulator interposed between the output of the delay networks and an output utilization means, means connected to said demodulator for deriving a carrier detection signal in response to said signal pulses for successively actuating the said switching means in different combinations in synchronization with said pulses to thereby enable said inserting means to set said different combinations of said delay networks into the path of the incoming signal pulses, said distortion measuring means includes means for producing peak-to-average difference signals giving a measure of the amount of distortion of the pulses from the output of said demodulator in terms of the delay characteristics of the transmission introduced by said different combinations of the delay networks combination and the transmission line; and said selecting means includes a comparator for comparing the successive distortion level indicating signals to identify the one which indicates a minimum amount of distortion.

13. The equalizer according to claim 11 further including means for indicating a condition of the transmission system requiring elimination of the selection operation and means interposed between said condition indicating means and said selection means for disabling said selection means and for inserting a predetermined combination of said delay networks into the path of incoming signal pulses upon the occurrence of said condition.

14. The equalizer according to claim 11 including means for reducing the number of different combinations of said delay networks being selectively interposed in the incoming path.

15. The equalizer according to claim 11 including means for selectively inserting at least one frequency dependent amplifier in series with said delay networks.

16. The equalizer according to claim 11 means for inserting a predetermined combination of frequency dependent amplifier and delay networks selectively and permanently in the path of the incoming signal pulses.

17. The equalizer according to claim 11 wherein said equalizer is interposed between a frequency demodulator and a transmission medium for providing equalization prior to demodulation of a frequency modulated incoming train of signal pulses.

18. The equalizer according to claim 11 further including means for inserting a predetermined combination of delay networks into said signal path when said selection means fails to function.

19. The equalizer according to claim 11, wherein said distortion measuring means includes means for deriving voltages substantially proportional to the level of the distortions introduced by said different combinations of said delay networks.

20. The equalizer according to claim 19 wherein the distortion measuring means includes means for detecting the positive and negative peak and DC average values of the signal pulses after distortion by the corresponding ones of the delay network combinations, and means for deriving a peak-to-average difference signal by subtraction of the negative peak value and the average value from the positive peak value.

21. The apparatus according to claim 11 wherin said selection means includes logic control circuitry adapted to enable said distortion measuring means and said selecting means to complete selection function during a single cycle of time duration during which a number of said signal pulses corresponding to the number of different combinations of said delay networks are applied thereto in succession.

22. The equalizer according to claim 21 wherein said distortion level indicating means includes means for detecting voltage outputs substantially inversely proportional to the level of distortion provided by corresponding combinations of delay networks and transmission;

said selection means includes means for storing the largest voltage in response to enabling signals from said logic control circuitry; and said logic circuitry includes means responsive to the largest output of said selection means for latching selected ones of switches into the incoming signal path.

23. The equalizer according to claim 21 wherein said distortion measuring means includes means for generating successive peak-to-average difference signals including means for generating the positive and negative peak value, and the DC average value of the distorted pulse from the outputs of the corresponding combinations of delay networks, said selection means including storage means and comparing means:

said logic control circuitry compares subsequent peak-to-average signals means with a prior peak-to-average signal stored in said storage means to detect any peak-to-average signal which equals or exceeds the stored peak-to-average signal; and said logic circuitry including a temporary buffer for storing in said storage means the last detected peak-to-average signal representing the combination of delay networks which provides the best equalization, and means for latching said combination into the incoming signal path at the end of the cycle.

24. The equalizer according to claim 23 wherein said logic circuitry is adapted to enable said delay distortion measuring means to generate peak-to-average signals for different combinations of delay networks during each of two successive cycles pulses ariving in series and storing, said storage means stores the maximum peak-to-average signal reading derived during the first cycle, and said comparing means compares the stored peak-to-average signal reading with each of the peak-to-average signals provided during the second cycle to generate a selection signal when a PAD reading of the second cycle equals or exceeds the stored PAD reading, and said logic circuitry includes means responsive to said selection signal from said comparator for activating selected combinations of said switches to interpose selected combinations of said delay network into the path of the incoming signals.

25. A method of equalizing frequency dependent delay distortion introduced to incoming signal pulses by a transmission medium comprising the steps of:

passing said signal pulses through different combinations of a plurality of networks having different delay versus frequency and attenuation versus frequency characteristics, selecting as a preferred combination the combination of networks which results in the least amount of frequency dependent distortion, and inserting said preferred combination of networks into the path of the incoming signal.

26. The method according to claim 25 including the steps of detecting a mode identifying signal indicating that the selection steps are unnecessary, and bypassing said selection steps and inserting a combination of networks having a predetermined delay versus frequency and attenuation versus frequency characteristics into the signal path in response to such a mode signal.

27. The method according to claim 25 including the steps of inserting at least one frequency dependent amplitude shaping network in the path of the incoming signal in combination with said selected delay networks.

28. The method according to claim 25 wherein a selected combination of delay networks and amplitude shaping networks are inserted in parallel between the transmission medium and a receiving means to provide the equalization.

29. The method according to claim 25 wherein the preferred combination is selected by passing separate pulses through the different combinations of networks to derive a series of signals individually indicative of the distortion resulting from different ones of said combinations, and then sensing a peak-to-average difference for each of said distortion indicative signals to identify the combination which results in the least amount of distortion of the received signal.

30. The method according to claim 29 wherein said peak-to-average differences are obtained by deriving from each of said distortion indicative signals a positive peak value and a DC average value and by then subtracting the negative peak value and the average value from the positive peak value.

31. The method according to claim 30 wherein said combinations are sequentially inserted in synchronization with said pulses into the incoming signal path to derive said distortion indicative signals.

32. The method according to claim 31 wherein the combination which results in the least amount of distortion is selected within a single cycle by comparing each succeeding peak-to-average difference against the preceding peak-to-average difference of greatest amplitude storing the peak-to-average difference of greatest amplitude until the end of the cycle, and then inserting into the signal path the combination of networks which provided the peak-to-average difference of greatest amplitude.

33. The method according to claim 31 wherein the combination which results in the least amount of distortion is selected in two cycles by storing the maximum peak-to-average difference obtained during the first cycle, successively comparing the stored peak-to-average difference against separate peak-to-average differences derived during the second cycle to identify any of the second cycle derived peak-to-average differences which equals or exceeds the stored peak to average difference, and latching into the signal path a delay network combination which yields an identified peak-to-average difference.

34. The method according to claim 33 further including the steps of detecting any failure to identify during the second cycle a peak-to-average signal difference equal to or exceeding the stored peaked to average signal difference, and inserting a network having a predetermined delay versus frequency characteristic into the signal path in the event of such a failure.

* * * * *